United States Patent
Wilson et al.

(10) Patent No.: US 12,294,207 B2
(45) Date of Patent: May 6, 2025

(54) SPLICE CLIP FOR CABLE TRAYS

(71) Applicant: ERICO International Corporation, Solon, OH (US)

(72) Inventors: Eric J. Wilson, Solon, OH (US); Jeffrey Alan Wilson, Cuyahoga Falls, OH (US); Sameer Alam Salmani, Thane (IN)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 18/635,178

(22) Filed: Apr. 15, 2024

(65) Prior Publication Data

US 2024/0258777 A1 Aug. 1, 2024

Related U.S. Application Data

(63) Continuation of application No. 18/167,224, filed on Feb. 10, 2023, now Pat. No. 11,962,135.

(60) Provisional application No. 63/309,342, filed on Feb. 11, 2022, provisional application No. 63/398,903, filed on Aug. 18, 2022, provisional application No. 63/478,569, filed on Jan. 5, 2023.

(51) Int. Cl.
*H02G 3/06* (2006.01)
*H02G 3/04* (2006.01)

(52) U.S. Cl.
CPC ......... *H02G 3/0608* (2013.01); *H02G 3/0456* (2013.01)

(58) Field of Classification Search
CPC .... H02G 3/0608; H02G 3/0456; H02G 3/263; H02G 3/0443; F16B 2/245; F16B 7/0433; F16B 21/125
See application file for complete search history.

(56) References Cited

U.S. PATENT DOCUMENTS

| | | | |
|---|---|---|---|
| 2,894,302 A | 7/1959 | Fox | |
| 3,042,351 A | 7/1962 | Du Bois | |
| 5,384,937 A * | 1/1995 | Simon | H02G 3/0443 24/295 |
| 6,193,434 B1 * | 2/2001 | Durin | H02G 3/0443 403/309 |
| 6,247,871 B1 * | 6/2001 | Nickel | H02G 3/0443 248/302 |
| 6,402,418 B1 * | 6/2002 | Durin | H02G 3/0443 403/309 |

(Continued)

FOREIGN PATENT DOCUMENTS

| | | |
|---|---|---|
| CN | 201851787 U | 6/2011 |
| CN | 111525475 A | 8/2020 |

(Continued)

*Primary Examiner* — Bayan Salone
(74) *Attorney, Agent, or Firm* — Quarles & Brady LLP

(57) ABSTRACT

A splice clip is provided for coupling discrete sections of a wire mesh cable tray. The splice clip can include a bolt with a base. The splice clip can also include a retainer with a set of pockets, including a first pocket and a second pocket. The first pocket can receive a first wire of a first discrete cable tray section and the second pocket can receive a second wire of a second discrete cable tray section. The bolt can be movable along the retainer between an open position and a closed position to secure the first and second wires in the first and second pockets.

18 Claims, 24 Drawing Sheets

(56) References Cited

U.S. PATENT DOCUMENTS

| | | |
|---|---|---|
| 6,489,566 B1 | 12/2002 | Durin |
| 6,590,154 B1* | 7/2003 | Badey .................. H02G 3/0443 174/480 |
| 7,462,785 B1 | 12/2008 | Davis et al. |
| 7,468,491 B2* | 12/2008 | Deciry .................. H02G 3/0608 174/480 |
| 7,476,801 B1* | 1/2009 | Davis .................. H02G 3/0608 403/329 |
| 7,586,036 B2 | 9/2009 | Davis et al. |
| 7,608,786 B2* | 10/2009 | Deciry .................. H02G 3/0443 174/99 R |
| 7,708,491 B2* | 5/2010 | Quertelet ............. H02G 3/0443 174/481 |
| 7,723,622 B2 | 5/2010 | Dukes et al. |
| 7,871,079 B2 | 1/2011 | Dukes et al. |
| 7,954,287 B2* | 6/2011 | Bravo ...................... H02G 3/22 52/220.1 |
| 7,954,776 B2 | 6/2011 | Davis et al. |
| 8,177,172 B2 | 5/2012 | Quertelet et al. |
| 8,424,814 B2 | 4/2013 | Davis et al. |
| 8,684,319 B2 | 4/2014 | Brouwer et al. |
| 8,757,559 B2 | 6/2014 | Davis et al. |
| 8,936,221 B2 | 1/2015 | Rouleau et al. |
| 9,042,111 B2 | 5/2015 | Urquhart et al. |
| 9,178,343 B2 | 11/2015 | Brouwer et al. |
| 9,853,428 B2 | 12/2017 | Brouwer et al. |
| 11,056,865 B2 | 7/2021 | Brouwer et al. |
| 11,121,531 B2 | 9/2021 | Cretella |
| 11,128,113 B2 | 9/2021 | Martinez et al. |
| 11,677,221 B2* | 6/2023 | Sledzinski ................ F16B 2/02 248/68.1 |
| 2003/0108385 A1 | 6/2003 | Finco et al. |
| 2003/0116682 A1 | 6/2003 | Finco et al. |
| 2005/0063775 A1 | 3/2005 | Boltz |
| 2006/0038091 A1* | 2/2006 | Winn .................. H02G 3/0608 248/49 |
| 2021/0102645 A1 | 4/2021 | Lee et al. |
| 2021/0262588 A1 | 8/2021 | Kruzel et al. |
| 2021/0348630 A1 | 11/2021 | Bachu et al. |
| 2022/0131352 A1 | 4/2022 | Sledzinski et al. |

FOREIGN PATENT DOCUMENTS

| | | |
|---|---|---|
| DE | 29700613 U1 | 3/1997 |
| DE | 102005018414 A1 | 11/2006 |
| EP | 1257032 A1 | 11/2002 |
| EP | 1193821 B1 | 5/2003 |
| EP | 1206021 B1 | 10/2005 |
| EP | 1727252 A1 | 11/2006 |
| EP | 1793464 A1 | 6/2007 |
| EP | 2346129 B1 | 7/2013 |
| EP | 2768098 B1 | 9/2015 |
| EP | 2884608 B1 | 11/2015 |
| EP | 1376807 B1 | 11/2016 |
| EP | 2830174 B1 | 5/2018 |
| EP | 2176931 B1 | 10/2019 |
| EP | 3644465 A1 | 4/2020 |
| ES | 1071943 U | 4/2010 |
| ES | 2629202 T3 | 8/2017 |
| FR | 2208219 A1 | 6/1976 |
| FR | 2542059 A1 | 9/1984 |
| FR | 2698416 B1 | 1/1995 |
| FR | 2857789 B1 | 9/2005 |
| FR | 2879036 A1 | 6/2006 |
| FR | 2888682 B1 | 9/2007 |
| FR | 2937399 B1 | 11/2010 |
| FR | 2953655 B1 | 6/2012 |
| FR | 2937400 B1 | 5/2013 |
| FR | 3040830 B1 | 9/2018 |
| GB | 2458750 B | 3/2012 |
| GB | 2467426 B | 4/2013 |
| GB | 2472889 B | 5/2013 |
| GB | 2482607 B | 5/2015 |
| GB | 2543510 A | 4/2017 |
| GB | 2524367 B | 1/2020 |
| KR | 10-2009-0009000 A | 1/2009 |
| KR | 10-0993138 B1 | 11/2010 |
| KR | 10-1509022 B1 | 4/2015 |
| KR | 10-2296292 B1 | 9/2021 |
| KR | 10-2296297 B1 | 9/2021 |
| PL | 223234 B1 | 10/2016 |
| WO | 2005/090845 A1 | 9/2005 |
| WO | 2012/104545 A1 | 8/2012 |
| WO | 2012/168644 A1 | 12/2012 |
| WO | 2013/007936 A2 | 1/2013 |
| WO | 2014/006246 A1 | 1/2014 |

* cited by examiner

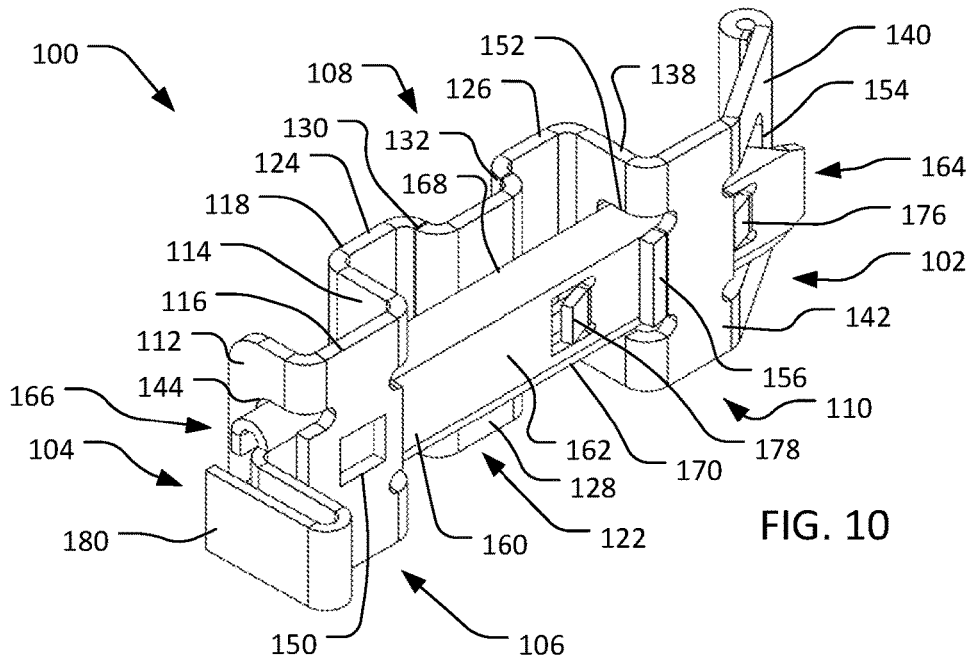
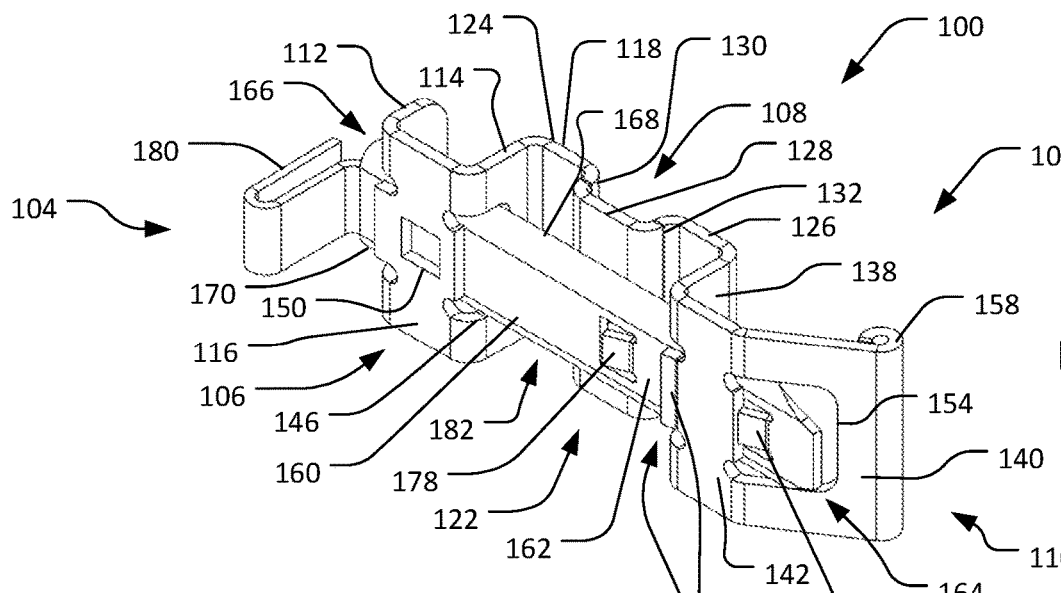
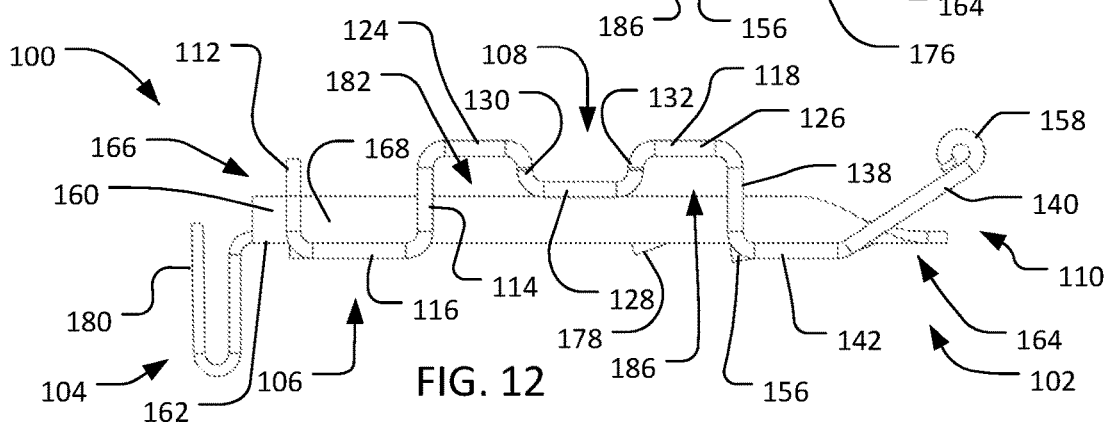

SPLICE CLIP FOR CABLE TRAYS

RELATED APPLICATIONS

This application claims priority under 35 U.S.C. §§ 119 and 120 to U.S. Non-provisional application Ser. No. 18/167,224, filed Feb. 10, 203 and titled "Splice Clip for Cable Trays," U.S. Provisional Application No. 63/309,342, filed Feb. 11, 2022 and titled "Splice Clip for Cable Trays", U.S. Provisional Application No. 63/398,903, filed Aug. 18, 2022 and titled "Splice Clip for Cable Trays," and U.S. Provisional Application No. 63/478,569, filed Jan. 5, 2023 and titled "Splice Clip for Cable Trays", all of which are incorporated herein by reference in their entireties.

BACKGROUND

Cable trays are used within the electrical installation industry to provide a continuous pathway and support for electrical or data/low voltage cabling within a building. Cable trays can have a shape of an open trough, for example, to allow access to lay cables therein or pulled there along. Cable trays can be wire-frame trays and can be manufactured or field-cut in discreet sections, which must be joined together.

Cable tray, specifically basket tray, is manufactured in discreet sections; typically 3 meters (10 feet) in length. When installed, the sections may need to be connected (spliced) mechanically to secure the sections to one another, and electrically to bond the sections for a ground path (equipment ground conductor).

SUMMARY

In many applications, it may be useful to mechanically secure and electrically bond discrete sections of a cable try without the use of tools. Traditional methods for joining sections of a cable tray rely on nuts, bolts, and washers. These methods add time and complication through multiple parts to the job of joining sections of a cable tray. Additionally, if the parts loosen over time, the electrical bonding connection between the tray sections may be lost. Accordingly, there is a need for a splice clip that can join two discrete sections of a cable tray capable of providing a secure mechanical connection and electrical bonding easily and reliably, without the use of multiple parts and requiring tools for installation.

Some embodiments of the invention can provide a splice clip for coupling discrete sections of a wire mesh cable tray. The splice clip can include a bolt with a base, a first ledge, and a second ledge opposing the first ledge. The base and the first and second ledges can define a passageway along the bolt. The splice clip can also include a retainer with a set of pockets, including a first pocket and a second pocket, and a set of guidance features configured to translate within the passageway to guide the bolt along and in engagement with the retainer. The first pocket can be configured to receive a first wire of a first discrete cable tray section and the second pocket can be configured to receive a second wire of a second discrete cable tray section. The bolt can be movable along the retainer between an open position in which at least one of the first or second pockets is open to receive the first or second wire, respectively, and a closed position in which the at least one of the first or second wires is retained within the first or second pockets, respectively, by the bolt.

In some embodiments, the bolt can further include a first leaf extending away from the base. Also, with splice clip in the closed position, the first leaf can protrude into the first pocket to contact the first wire, within the first pocket, and urge the first wire in a spring-like manner against the retainer.

In some embodiments, the set of guidance features of the retainer can include a first blade adjacent the first pocket and a second blade adjacent the second pocket. The first blade can have a first engagement feature and the second blade can have a second engagement feature. The first and second engagement features can be configured to engage corresponding engagement features of the bolt to maintain the position of the bolt relative to the retainer. The first engagement feature can be an aperture and the second engagement feature can be a retainer tab. The engagement features of the bolt can include a first tab arranged to separately engage the first and second engagement features. The first tab can be supported on a cantilevered tab release of the bolt that is configured to be moved relative to the base to remove the first tab from engagement with the first or second engagement feature of the retainer. The bolt can be movable in an insertion direction from the open position to the closed position. The engagement features of the bolt can include a second tab that extends opposite the insertion direction toward a free end thereof and can have a partial return bend to angle away from the retainer. The partial return bend can be configured to move the second tab to out of engagement with the first engagement feature as the bolt is slid opposite the insertion direction.

In some embodiments, the guidance features of the retainer can further include a blade located between the first and second pockets. The blade can include a threaded hole arranged to be aligned with a hole in the base of the bolt, with the bolt in the closed position, to receive a threaded grounding fastener.

Some embodiments of the invention can provide a splice clip for coupling discrete sections of a wire mesh cable tray. The splice clip can include a bolt with a base and opposing channels that extend along the base in an insertion direction and a retainer that can include a set of pockets for wires of cable trays, including a first pocket for a first wire of a first discrete cable stray section and a second pocket for a second wire of a second discrete cable tray section. The retainer can also include a set of guidance features, including a bridge structure between the first and second pockets that extends transverse to the insertion direction into alignment with the opposing channels, to extend into the opposing channels to guide translation of the bolt along the retainer in the insertion direction.

In some embodiments, the set of guidance features can include a first blade opposite the first pocket from the bridge structure and a second blade opposite the second pocket from the bridge structure. The first and second blades can extend transverse to the insertion direction into alignment with the opposing channels to further guide translation of the bolt along the retainer in the insertion direction. The bolt and the set of guidance features can collectively include a plurality of tabs and a plurality of recesses arranged to selectively secure the splice clip in a plurality of staging configurations, including a first stage, a second stage, and a third stage. With the splice clip in the first stage, the first blade can be received within opposing channels and the first and second pocket can be open to receive the first and second wires. With the splice clip in the second stage, the first blade and the bridge structure can be received within the opposing channels, the bolt can extend to close the first pocket, and the second pocket can be open to receive the second wire. With the splice clip in the third stage, the first blade, the bridge structure, and the second blade can be received within the opposing channels and the bolt can extend to close the first and second pockets. The plurality of tabs cab include a tab that includes a partial return bend and is aligned with the first blade to secure the bolt in the second stage. The bolt can further include a handle. With the bolt in a closed position in which the bolt closes the first and second pockets, the handle can abut the first blade.

In some embodiments, the bolt can further include leaves located along at least one of the opposing channels and can extend away from the base. With the bolt in a closed position in which the bolt closes the first and second pockets, the leaves can be arranged to protrude into the first and second pockets, to contact the first and second wires received within the first and second pocket and resiliently urge the first and second wires into the retainer.

Some embodiments of the invention can provide a method for joining a first discrete section and a second discrete section of a wire mesh cable tray. The method can include attaching a splice clip to a first wire of the first discrete section by arranging a retainer of the splice clip to receive the first wire within a first pocket of the retainer. A bolt of the splice clip can be slid along a first guidance feature of the retainer from an open position to a staged position, to fixedly engage the bolt in the staged position on the retainer and thereby retain the first wire within the first pocket. The method can also include attaching a second wire of the second discrete section to the splice clip by receiving the second wire within a second pocket of the retainer. The bolt can be slid further to disengage the fixed engagement of the bolt in the staged position and slide the bolt along a second guidance feature of the retainer from the staged position to a closed position on the retainer, to fixedly engage the bolt in the closed position and thereby retain the first wire within the first pocket and the second wire within the second pocket.

In some embodiments, sliding the bolt to the staged position can further include sliding the bolt to contact a bridge structure of the splice clip between the first and second pockets.

In some embodiments, the bolt can be fixedly engageable in the staged position by engagement of a first engagement feature on the bolt with a second engagement feature on the first guidance feature of the retainer. Further, the bolt can be fixedly engageable in the closed position by engagement of a third engagement feature of the bolt with a fourth engagement feature on the second guidance feature of the retainer. Additionally, the bolt can be fixedly engageable in an open position, in which by engagement of the third engagement feature of the bolt with the second engagement feature of the retainer.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 10 is a top front left isometric view of the splice clip of FIG. 1 in a third position;

FIG. 11 is a top front right isometric view of the splice clip of FIG. 1 in the third position;

FIG. 12 is a top plan view of the splice clip of FIG. 1 in the third position;

DETAILED DESCRIPTION

Figure 1:
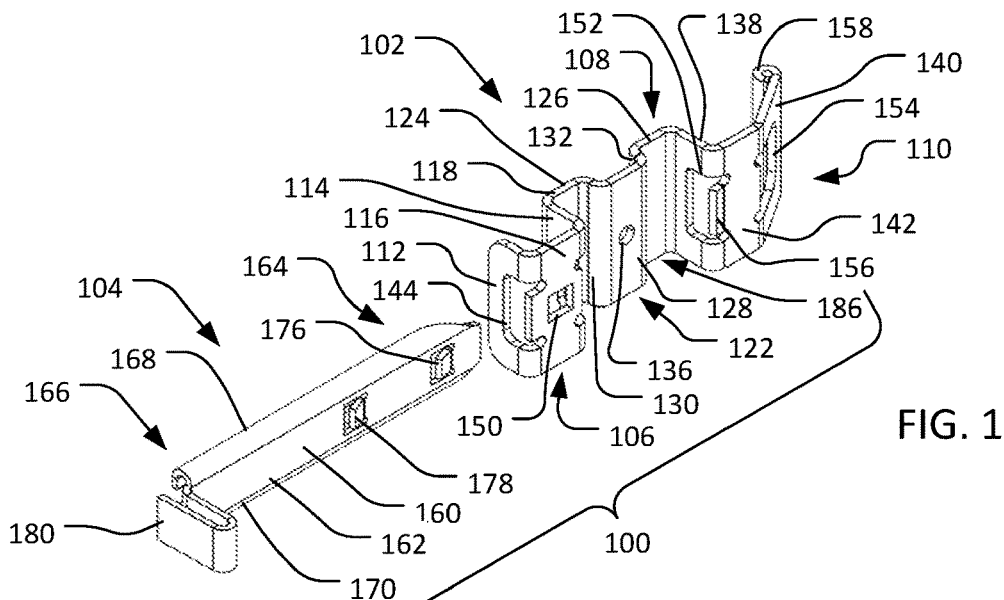
FIG. 1 is a top front left exploded isometric view of a splice clip in an according to an embodiment of the invention.
Figure 2:
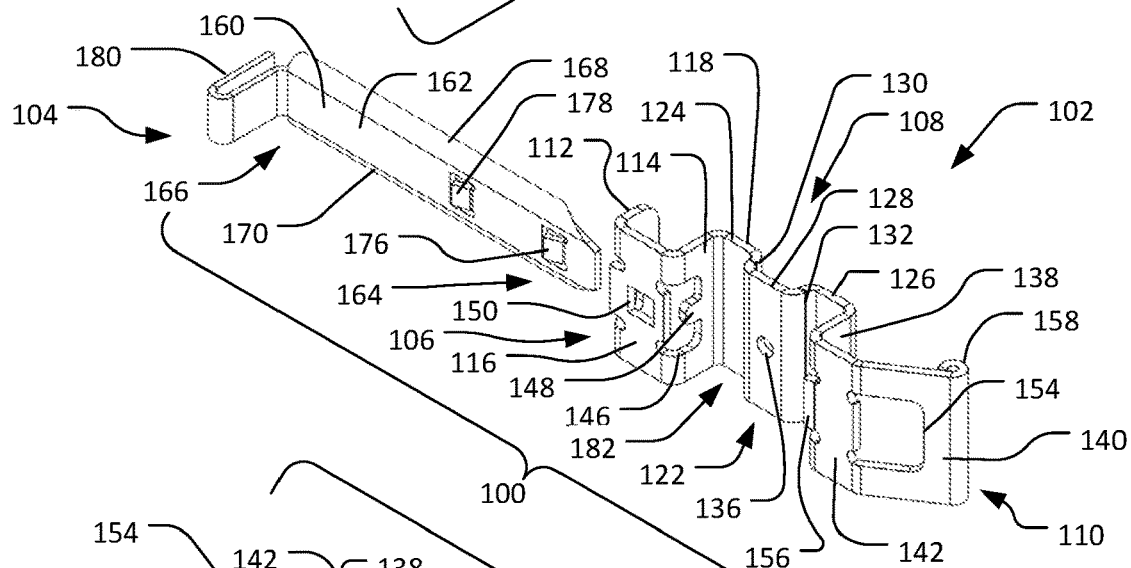
FIG. 2 is a top front right exploded isometric view of the splice clip of FIG. 1.
Figure 3:
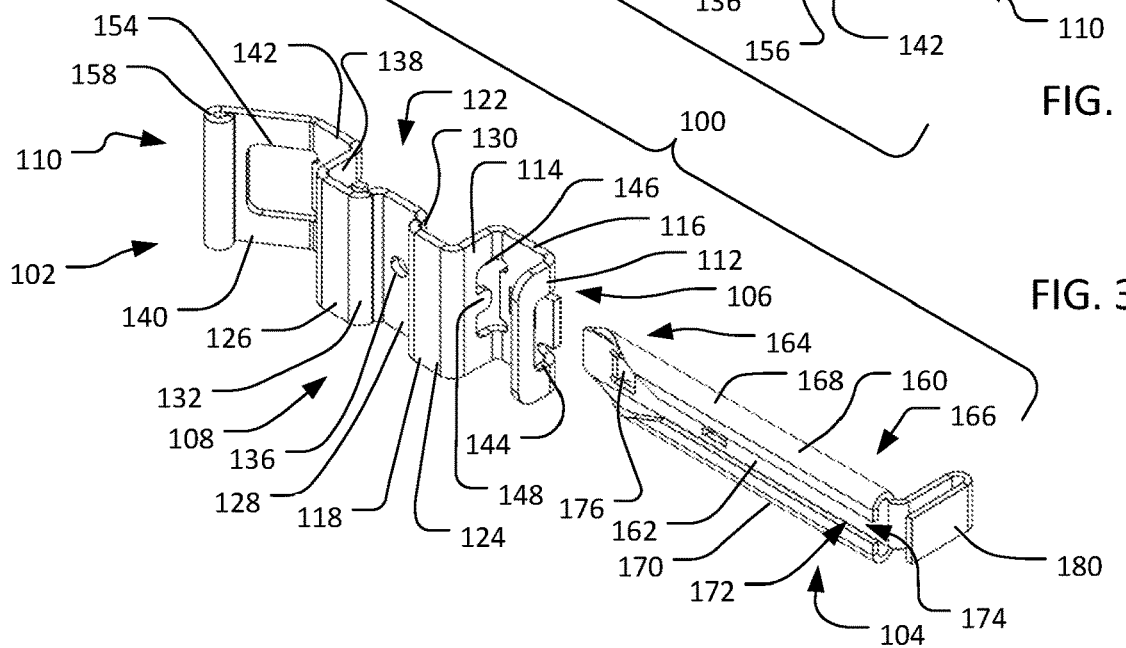
FIG. 3 is a top rear left exploded isometric view of the splice clip of FIG. 1.
Figure 4:
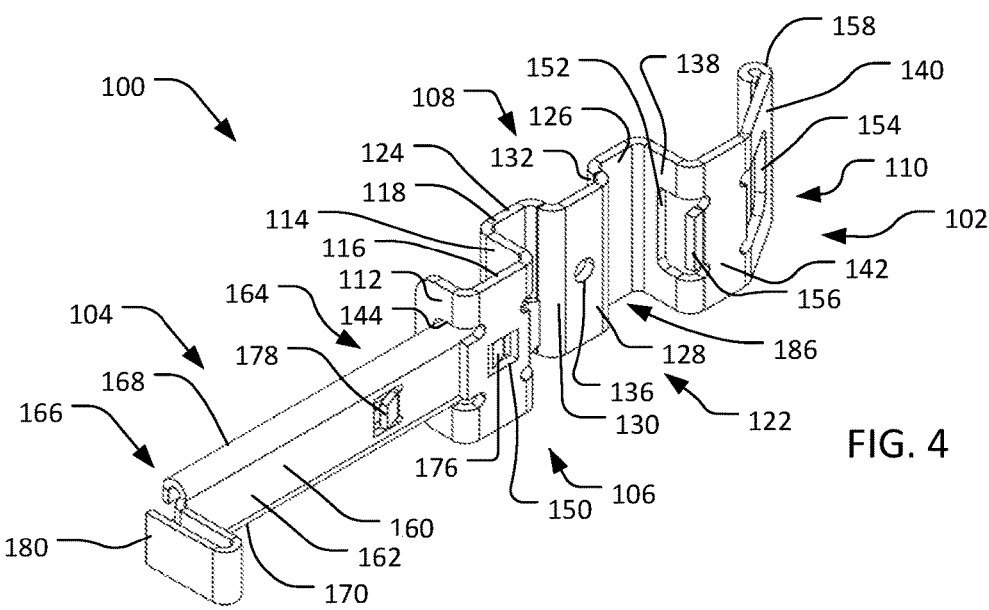
FIG. 4 is a top front left isometric view of the splice clip of FIG. 1 in a first position.
Figure 5:
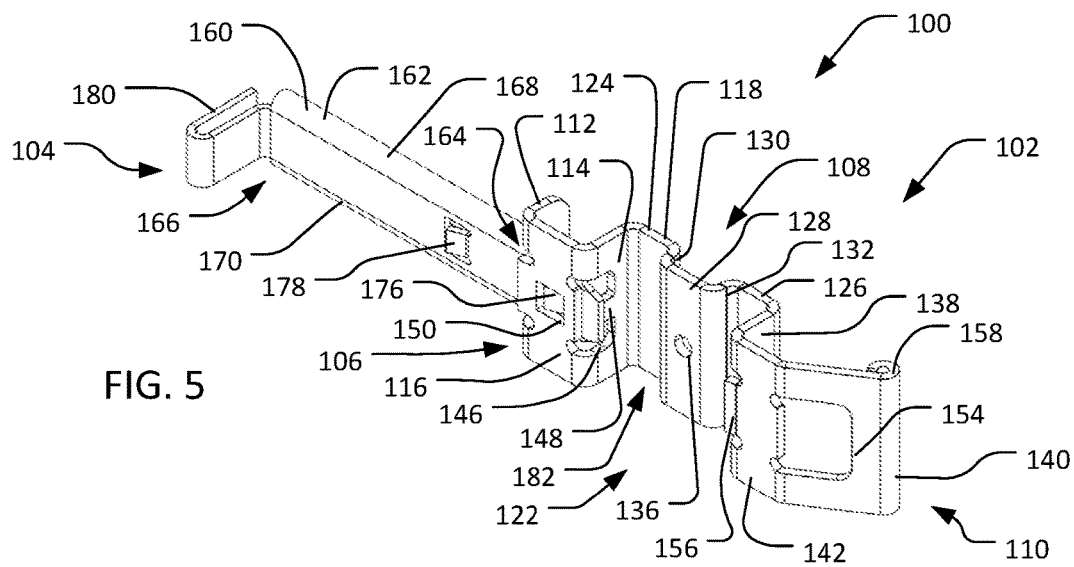
FIG. 5 is a top front right isometric view of the splice clip of FIG. 1 in the first position.
Figure 6:
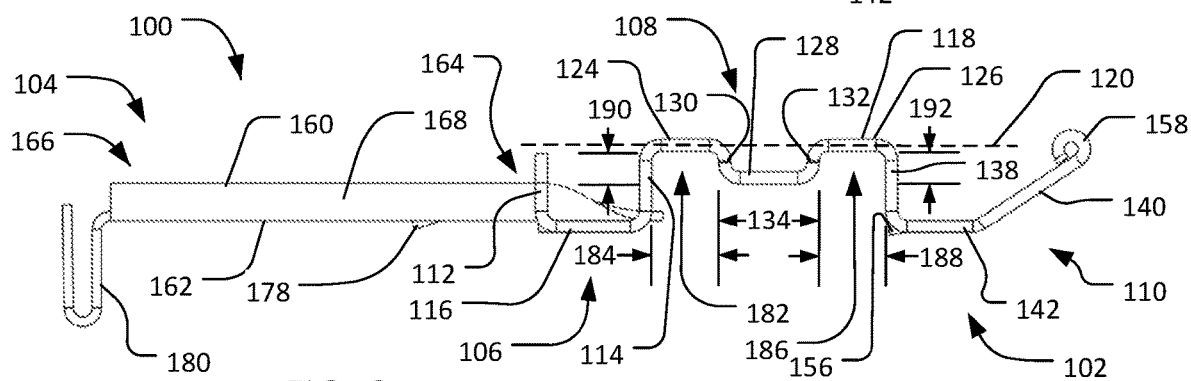
FIG. 6 is a top plan view of the splice clip of FIG. 1 in the first position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

As used herein in the context of geometric descriptions, unless otherwise limited or defined, "substantially" indicates correspondence to a particular shape or dimension within conventional manufacturing tolerances for components of a similar type or that are formed using similar processes. In this regard, for example, "substantially similar in configuration" can indicate a part that deviates from another part having the same elements within acceptable manufacturing tolerances.

A splice clip configured to be installed to mechanically join and electrically bond discrete sections of a wire mesh cable tray system easily and reliably is described herein. Some embodiments of the splice clip can be used to quickly join sections of wire mesh cable tray through a tool-free, push-on, sliding/latching installation. Wire basket cable trays generally comprise a series of longitudinal and lateral wires that form a 2 inch by 4 inch grid along the bottom of tray. Wire basket trays 4 inch and deeper also typically have the same 2 inch by 4 inch grid found on the sides of the tray. Some embodiments according to the invention can provide a quick and easy connection between bottoms of the cable tray sections installation, the sides of the cable tray sections, or both the bottoms and sides of the cable tray sections. A splice clip according to an embodiment of the invention can be installed by aligning the splice clip relative to a first cable tray section (or, inherently, vice versa) so that a first wire of the first cable tray section is received within a first pocket in a retainer of the splice clip and a bolt of the splice clip can be slid in an insertion direction, relative to the retainer and the first cable tray, to retain the first wire within the first pocket. A second wire of a second cable tray section can be received within a second pocket in the retainer and the bolt can be slid further (in the insertion direction) to retain the second wire within the second pocket. Multiple splice clips can be placed along the bottom or sides of the wire basket cable tray to secure the joined first and second cable tray sections. Further, in some examples, a bolt of a splice clip can be slid opposite a relevant insertion direction to release one or more wires from the splice clip (e.g., with the bolt partly or fully removed from the splice clip).

Some embodiments of the splice clip can be configured to space the cable tray sections apart a predetermined distance. This can be helpful when longitudinal wires of the cable tray sections extend beyond the lateral wires to be received in the splice clip. The space can provide an area for the longitudinal wire excess to be located without causing interference with the securing of the splice clip to the cable tray sections.

In metallic cable tray installations for supporting electric cables, the cable tray sections need to be electrically bonded to form an equipotential grid in which no one section has a different electrical potential than any of the other sections. Not doing so can lead to undesired electricity flowing through sections of the cable tray, causing potentially hazardous conditions for the unintentional discharge of electricity. Therefore, some embodiments of the splice clip can provide electrical bonding between the cable tray sections.

Some of the discussion below describes a splice clip that can be used to secure together sections of a cable tray. The context and particulars of this discussion are presented as examples only. For example, embodiments of the disclosed invention can be configured in various ways, including with other shapes and arrangements of elements. Similarly, embodiments of the invention can be used with arrangements of cable support structures, electrical brackets, or other assemblies other than those expressly illustrated or described herein.

Figure 49:
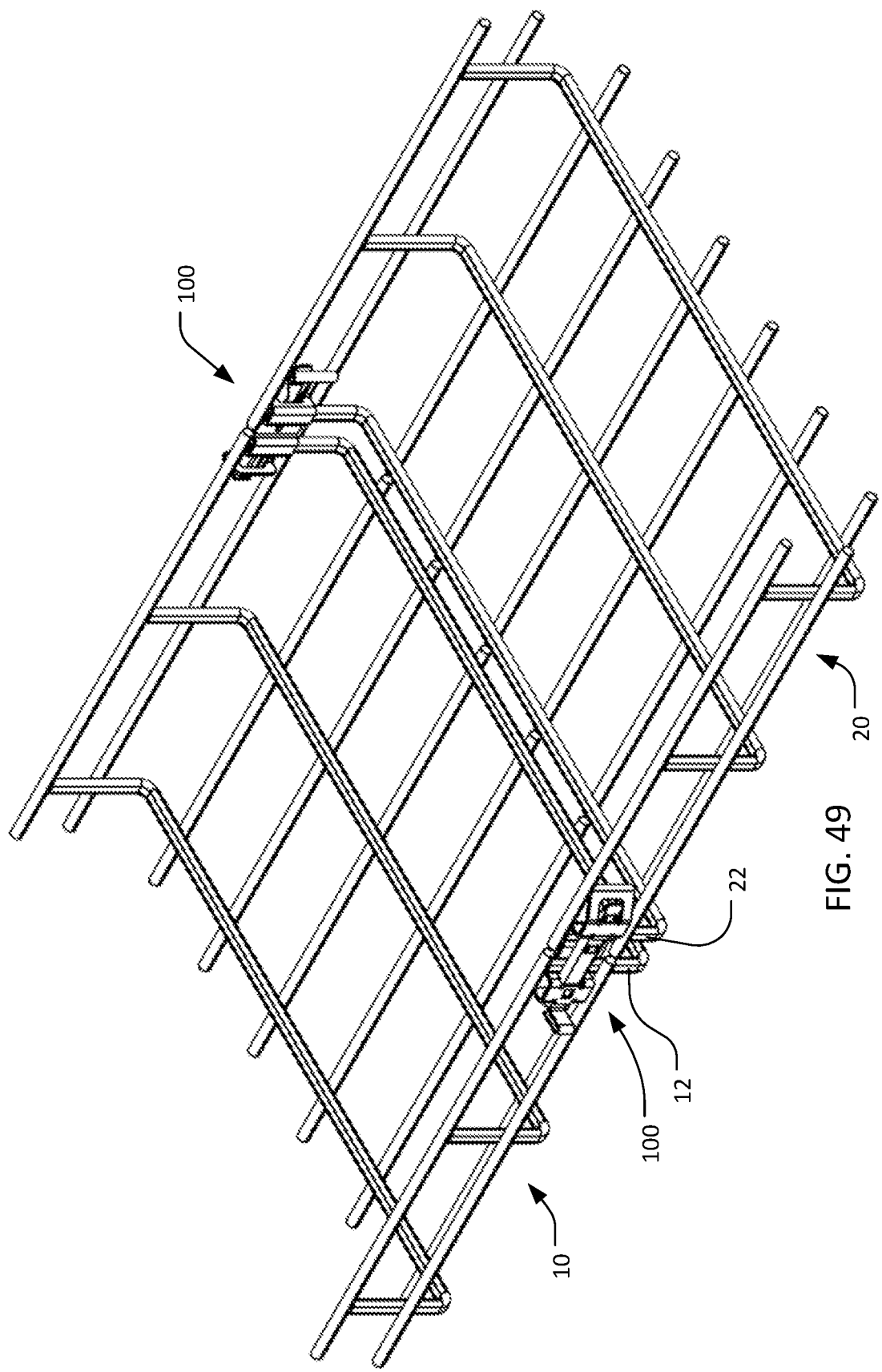
FIG. 49 is a top front right isometric view of a set of splice clip assemblies of FIG. 1 securing together two discrete portions of wire mesh cable tray according to an embodiment of the invention.

FIGS. 1 through 12 illustrate a splice clip 100 according to an embodiment of the invention that can be configured to be attached to and join discrete section of wire mech cable tray (for example, first and second discrete sections of mesh cable tray 10, 20 shown in FIG. 49). The splice clip 100 includes a retainer 102 and a bolt 104 slidably movable relative to the retainer 102. As shown, the retainer 102 is formed from a unitary piece of material, which, through manufacturing processes, provides a series of staggered partitions defining a pre-stage section 106, a mid-section 108, and a catch section 110. The pre-stage section 106 includes a first partition 112 opposite a second partition 114 and joined together by a third partition 116. The mid-section 108 includes a base 118, defining a base plane 120, and a bridge 122. The bridge 122 extends from and divides the base 118 into a first base section 124, adjacent the second partition 114 of the pre-stage section 106, and a second base section 126. The bridge 122 has a U-shape profile with a deck 128 spaced from and parallel with the base plane 120. Further, a set of side walls, including a first side wall 130 and a second side wall 132 extend from and between the deck 128 and the base 118. The space between the first and second side walls 130, 132 define a bridge width 134 (see FIG. 6). It is contemplated that the bridge width 134 can be sized to allow the passage of a bolt (not shown) through a hole 136 in in the deck 128 if additional retention security is desired. Additionally, the catch section 110 includes a fourth partition 138, adjacent the second base section 126, a fifth partition 140 opposite the fourth partition 138 and joined together by a sixth partition 142.

Continuing, the second partition 114, the first base section 124, and the first side wall 130 define a first pocket 182, with the distance between the second partition 114 and the first side wall 130 defining a first pocket width 184. The first pocket width 184 is configured to be greater than or about equal to (including slightly less than) a width of a wire of a cable mesh tray (shown in FIG. 49). Additionally, the fourth partition 138, the second base section 126, and the second side wall 132 define a second pocket 186, with the distance between the fourth partition 138 and the second side wall 132 defining a second pocket width 188. Similarly, the second pocket width 188 is configured to be greater than or about equal to (including slightly less than) a width of a wire of a cable mesh tray (shown in FIG. 49).

Moreover, the pre-stage section 106 of the retainer 102 of the splice clip 100 shown in FIGS. 1 through 12 includes a first guide slot 144 within first partition 112 and a second guide slot 146 within the second partition 114. Further, a protrusion 148 is provided on the second partition 114 that extends into the second guide slot 146 and in the direction of the third partition 116. Additionally, the third partition 116 has an aperture 150.

Additionally, the catch section 110 includes a third guide slot 152 in the fourth partition 138 and a fourth guide slot 154 in the fifth partition 140. Further, a catch 156 extends obliquely from the sixth partition 142 in the direction of the pre-stage section 106. As shown, the fifth partition 140 can depend obliquely from the sixth partition 142 and can terminate at a curved or rounded terminal end 158. The rounded terminal end 158 provides a smooth surface that, when the retainer 102 is installed on a discrete section of wire cable tray 10 (shown in FIG. 45), does not damage cables, wires, or the like that are pulled there along or placed there against.

In FIGS. 1 through 12, the bolt 104 is similarly shown as being formed from a unitary piece of material and includes features configured to engage with the retainer 102. For example, the bolt 104 has a bolt body 160 including a base 162 extending from a first end 164 to a second end 166 of the bolt body 160 and a set of opposing ledges, including a first ledge 168 and a second ledge 170, extending from and along the base 162 to define an opening 172 between the first and second ledges 168, 170 and a passageway 174 that extends within and along the bolt body 160. The base 162 and the first and second ledges 168, 170 can define a C-shape cross-sectional profile. Further, the configuration of the first and second ledges 168, 170 can increase the overall rigidity of the bolt 104. Additionally, a first tab 176 and a second tab 178 spaced from the first tab 176 extend obliquely from the base 162, in a direction opposite the passageway 174. The bolt 104 also has a handle 180 extending from the bolt body 160 adjacent the second end 166 of the base 162. The handle 180 is configured to be gripped by an operator during installation, or removal, of the bolt 104 from the retainer 102.

In some embodiments it is contemplated that the splice clip 100 can be spot welded to the first wire 12 and arranged as in the second position (shown in FIG. 46), for example, when discrete sections of cable mesh trays are manufactured with pre-installed splice clips.

As shown in FIGS. 4 through 12, the bolt 104 is configured to be slidably received within the retainer 102 in a number of positions as the bolt 104 is moved in an installation direction. For example, in FIGS. 4 through 6, the first end 164 of the bolt body 160 is received through the first guide slot 144 of the first partition 112 and the second guide slot 146 of the second partition 114 by being moved in an insertion direction (as viewed from FIG. 6, the insertion direction is from left to right). Additionally, the first tab 176 extends into and thus engages with the aperture 150 of the third partition 116. The first tab 176 is arranged and configured to prevent the movement of the bolt 104 in a removal direction, opposite the installation direction, because the first tab 176 is configured to contact the edge of the aperture 150 when movement of the bolt 104 in the removal direction is attempted, effectively lockingly engaging the bolt 104 with the retainer 102. In this first position, or pre-stage position, of the slide clip 100, access to both the first and second pockets 182, 186 is available, and therefore open to receiving lateral wires from discrete wire mesh cable tray section therein. Moreover, if desired, movement of the bolt 104 in the removal direction from the first position can be achieved by urging the first tab 176 toward the passageway 174 and out of contact with the edge of the aperture 150 and pulling the bolt 104 in the removal direction.

Figure 7:
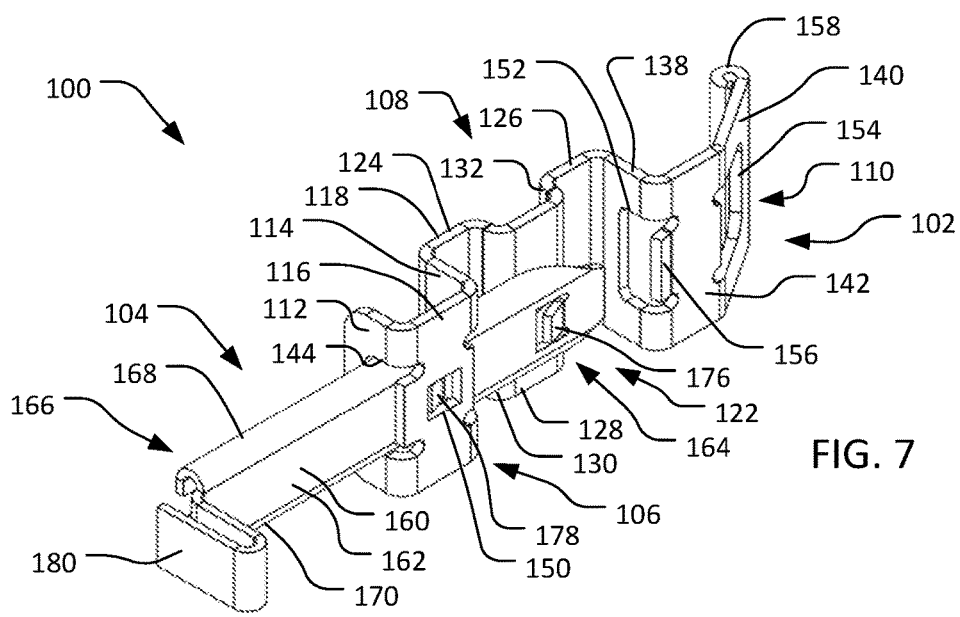
FIG. 7 is a top front left isometric view of the splice clip of FIG. 1 in a second position.
Figure 8:
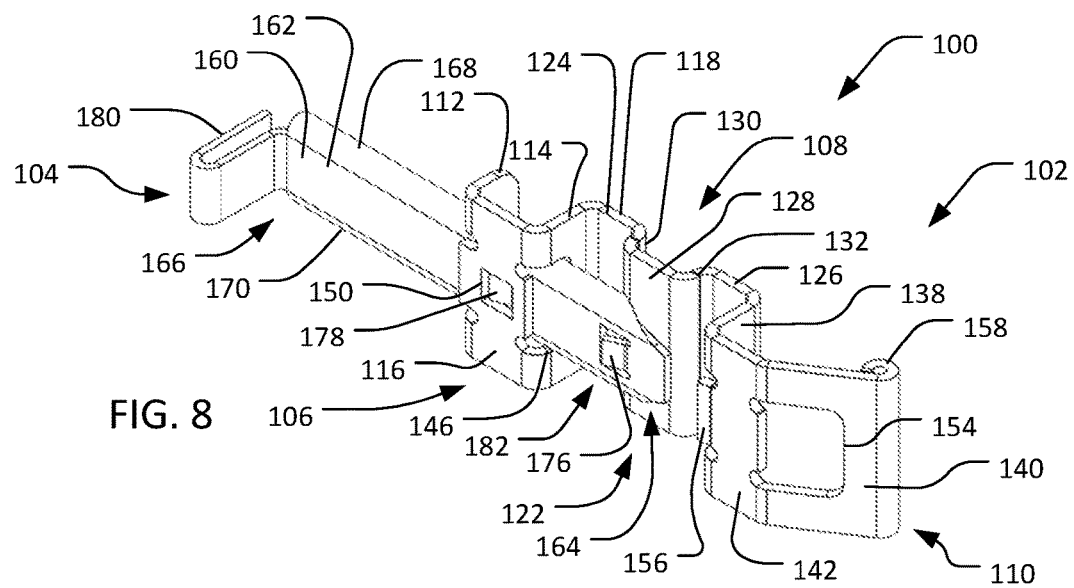
FIG. 8 is a top front right isometric view of the splice clip of FIG. 1 in the second position.
Figure 9:
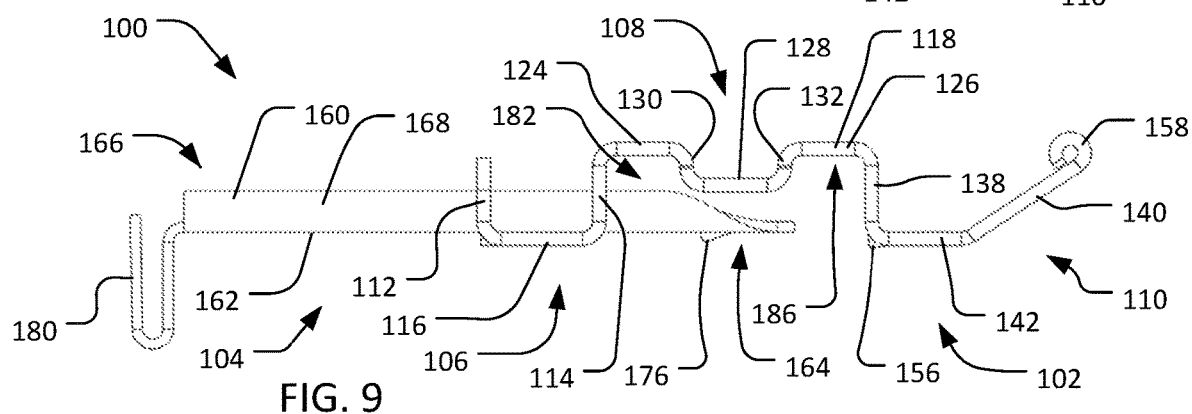
FIG. 9 is a top plan view of the splice clip of FIG. 1 in the second position.
Figure 13:
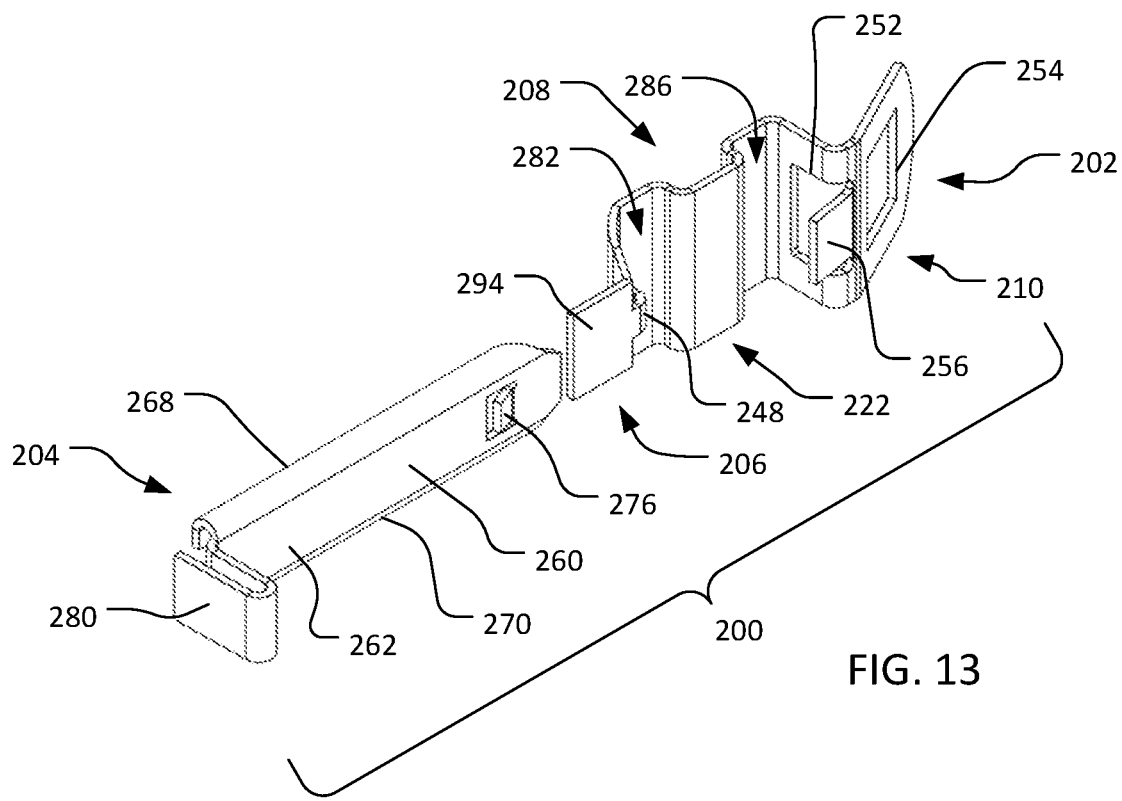
FIG. 13 is a top front left exploded isometric view of a splice clip according to another embodiment of the invention.
Figure 14:
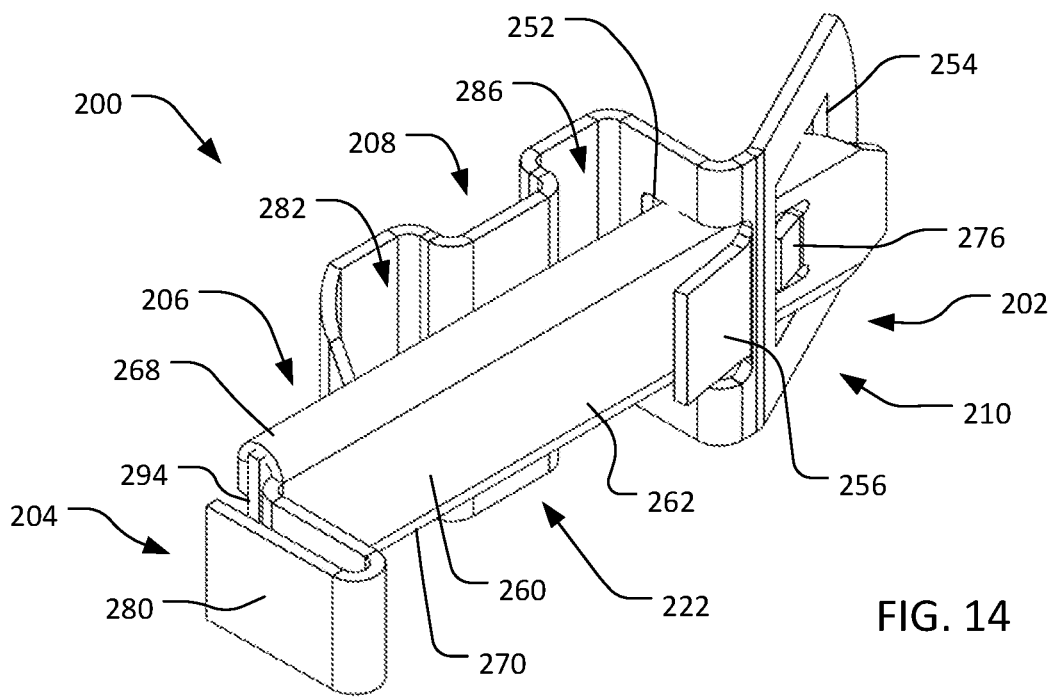
FIG. 14 is a top front left isometric view of the splice clip of FIG. 13 in a closed position according to an embodiment of the invention.
Figure 15:
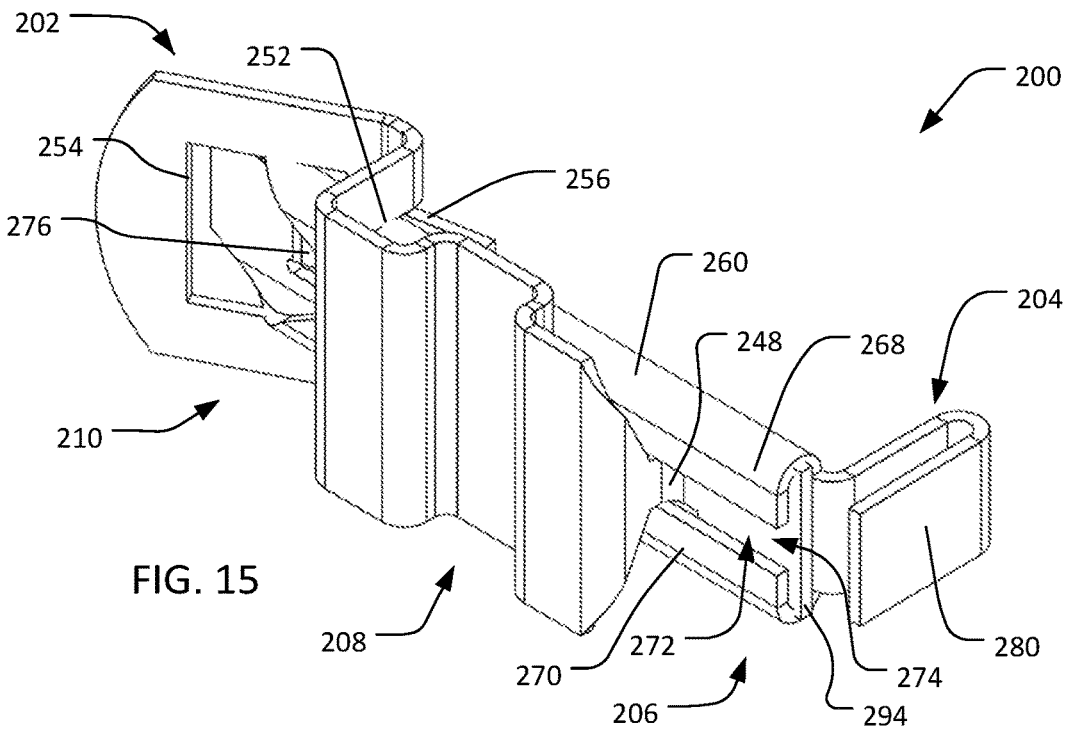
FIG. 15 is a top rear left isometric view of the splice clip of FIG. 13 in the closed position.
Figure 16:
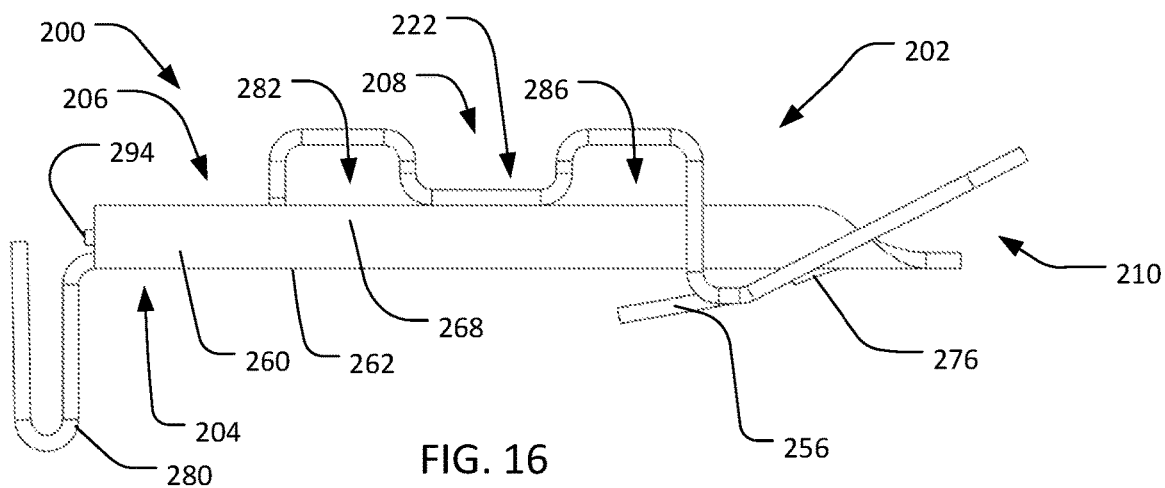
FIG. 16 is a top plan view of the splice clip of FIG. 13 in the closed position.
Figure 17:
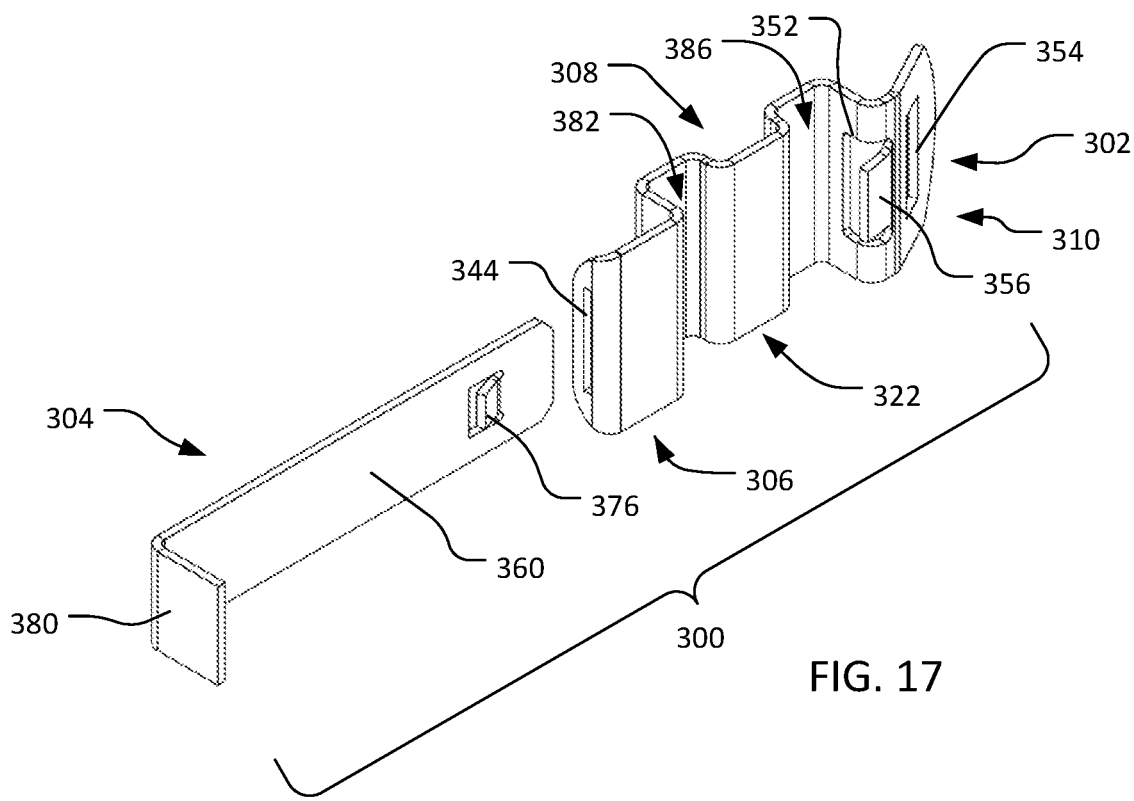
FIG. 17 is a top front left exploded isometric view of a splice clip according to another embodiment of the invention.
Figure 18:
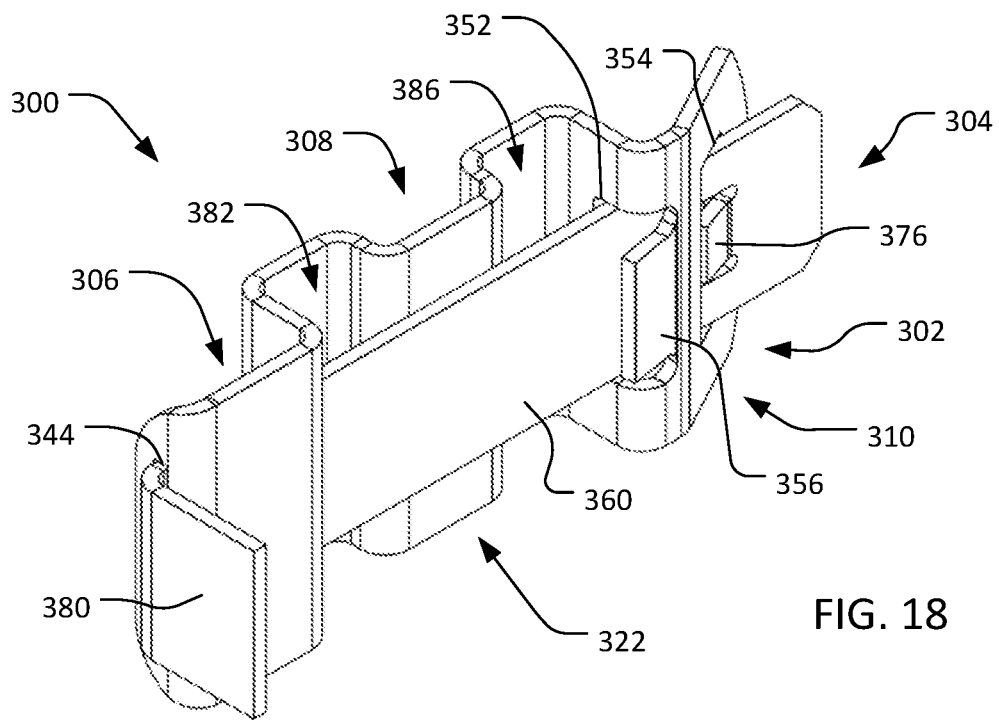
FIG. 18 is a top front left isometric view of the splice clip of FIG. 17 in a closed position according to an embodiment of the invention.
Figure 19:
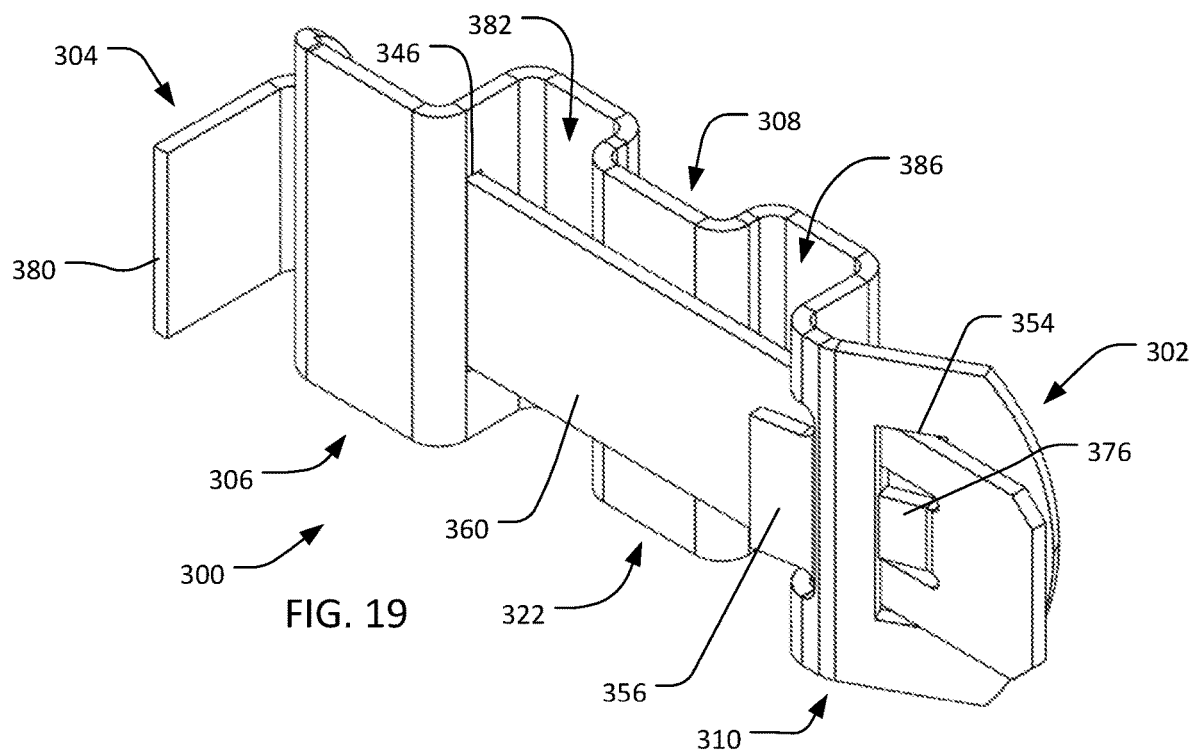
FIG. 19 is a top front right isometric view of the splice clip of FIG. 17 in the closed position.
Figure 20:
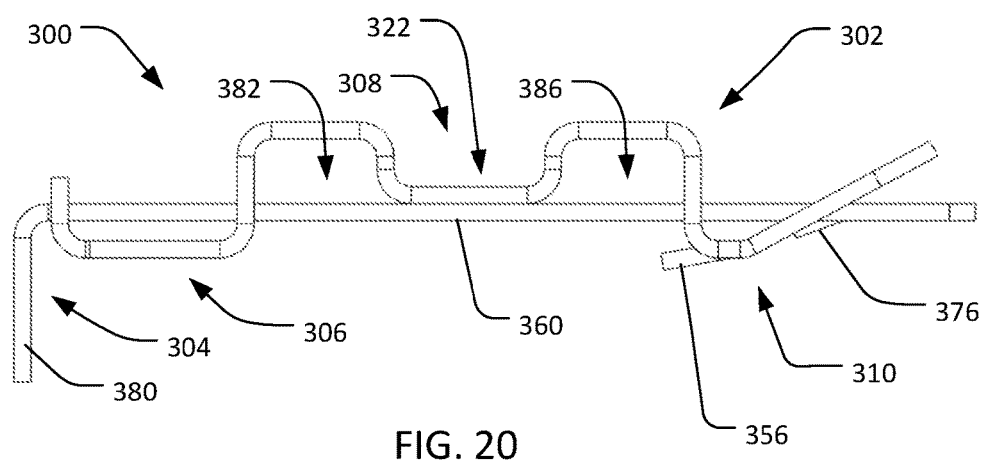
FIG. 20 is a top plan view of the splice clip of FIG. 17 in the closed position.

Further, in FIGS. 7 through 9, the bolt 104 is slidably moved further in the insertion direction relative to the retainer 102 and into a second position. In the second position, the protrusion 148 extending within the second guide slot 146 is received in the opening 172 and extends into the passageway 174 of the bolt body 160. Further, the second tab 178 is received and engaged within the aperture 150 of the third partition 116. Similar to the relationship between the first tab 176 and the aperture 150, the second tab 178 is arranged and configured to prevent the movement of the bolt 104 in a removal direction. Additionally, the bolt body 160 extends partially over the mid-section 108 of the retainer 102 and closes access to the first pocket 182, although access to the second pocket 186 is still available. Further, the distance between the bolt body 104 and the first base section 124 defines a first pocket depth 190. Moreover, if desired, movement of the bolt 104 in the removal direction from the second position can be achieved by urging the second tab 178 toward the passageway 174 and out of contact with the edge of the aperture 150 and pulling the bolt 104 in the removal direction.

In FIGS. 10 through 12, the slide clip 100 is shown in a third, fully-engaged, position. In the third position, the first end 164 of the bolt body 160 is received through the third guide slot 152 in the fourth partition 138 and the fourth guide slot 154 of the fifth partition 140 of the catch section 110. Further, the first tab 176 extends into the fourth guide slot 154 and is configured to contact and engage with the edge thereof if movement of the bolt 104 in the removal direction is attempted. Additionally, the bolt body 160 extends fully over the mid-section 108 of the retainer 102 and further closes access to the second pocket 186. Further, the distance between the bolt body 104 and the second base section 126 defines a second pocket depth 192. Further, during the transition from the second position (shown in FIGS. 7 through 9) to the third position (shown here), the catch 156 is configured to contact the first end 164 of the bolt body 160 and urge the first end 164 toward the third guide slot 152. Moreover, if desired, movement of the bolt 104 in the removal direction from the third position can be achieved by urging the first tab 176 toward the passageway 174 and out of contact with the edge of the fourth guide slot 154 and pulling the bolt 104 in the removal direction.

As discussed above, a plurality of guidance features are provided that are configured to guide the bolt 104 along the retainer 102. For example, the first, second, third, and fourth guide slots 144, 146, 152, 154 are configured to provide a path therethrough for the bolt body 160 to follow. Additionally, the protrusion 148, as received within the opening 172 between the first and second opposing ledges 168, 170, is configured to aid in maintaining the position of the bolt body 160 within the second partition 114. Further, the catch 156 is configured to contact and urge the bolt body 460 into alignment with the third guide slot 152 in the fourth partition 138 to ensure continued movement of the bolt 102 in the insertion direction.

In some embodiments, it is further contemplated that the first and second opposing ledges 168, 170 can be disposed obliquely away from the base 162. Then, as the bolt 104 is moved in the insertion direction relative to the retainer 102, the first and second opposing ledges 168, 170 are contacted by an edge of at least one of the first, second, third, or fourth guide slot 144, 146, 152, 154, bent inward toward the base 162, and create an enhanced engagement of the bolt 104 and the retainer 102 due to the first and second opposing ledges 168, 170 biasingly urging contact of the first and second opposing ledges 168, 170 and the base 162 with the first, second, third, or fourth guide slot 144, 146, 152, 154.

Also as discussed above, a plurality of engagement features are provided that are configured to secure the slide clip in one or more positions or to visually or tactilely indicate that the slide clip 100 is in one of the positions (e.g., the pre-stage position, the second position, and the third position). For example, engagement features of the bolt 104 and the retainer 102 include the first and second tabs 176, 178 of the bolt 104 and the aperture 150 and the edge of the fourth guide slot 154 of the retainer 102. These features can engage with each other in the combinations described above, for example, to retain the position of the bolt 104 relative to the retainer 102. Although the illustrated configuration of engagement features may be particularly advantageous, in some examples one or more of the tabs 176, 178 can be included on the retainer 102 (e.g., at the illustrated locations of the aperture 150 and at or adjacent the fourth guide slot 154) or one or more apertures can be included on the bolt 104 (e.g., at the illustrated locations of the tabs 176, 178). Further, unless otherwise specified, this inverted arrangement of engagement features or other mixed arrangements of tabs and apertures can also be applied relative to other similar tab and aperture arrangements as discussed below, in particular as presented to secure a bolt to a retainer in a pre-stage configuration, in a closed position, or otherwise. Some engagement features can be configured as tabs on one component (e.g., on a bolt) that are arranged to engage corresponding tabs on another component (e.g. on a retainer), rather than as tabs configured to engage corresponding openings (e.g., as discussed above). And some such examples can be implemented via substitution of appropriately configured tabs for one or more opening relative to one or more of the examples illustrated herein. Likewise, some arrangements can include non-tab protrusions (e.g., detent bumps) and corresponding openings (e.g., recesses rather than apertures), including with such protrusions and openings similarly positioned as sets of tab and opening engagement features as discussed above and below and illustrated in the figures.

FIGS. 13 through 16 illustrate another embodiment of a splice clip 200 according to the invention, as also can be attached to and join discrete sections of wire mesh cable tray (for example, the first and second discrete sections of mesh cable tray 10, 20 shown in FIG. 49). In many aspects, the splice clip 200 is similar to the splice clip 100 described above and similar numbering in the 200 series is used for the splice clip 200. For example, the splice clip 200 includes a retainer 202 with a pre-stage section 206; a mid-section 208 with a bridge 222; a catch section 210 with guide slots 252, 254 and a catch 256; and first and second pockets 282, 286. Further, the splice clip 200 includes a bolt 204 with a handle 280 and a bolt body 260 having first and second opposing ledges 268, 270 extending from a base 262 and defining an opening 272 and a passageway 274 and a tab 276 extending from the base 262 in the opposite direction of the first and second opposing ledges 268, 270. Further, the splice clip 200 is configured to retain wires from two discrete sections of wire mesh cable tray within the first and second pockets 282, 286 and held therein with the bolt 204 when the bolt 204 is in a closed position with the tab 276 extending within and abutting an edge of the guide slot 254 (shown in FIGS. 14 through 16).

In some aspects, however, the splice clips 100, 200 differ from each other. For example, the pre-stage section 206 of the splice clip 200 comprises a blade 294 extending from a protrusion 248. The blade 294 is configured to translate within the passageway 274, between the base 262 and the first and second opposing ledges 268, 270, of the bolt 204. Further, the protrusion 248 is sized and configured to translate within the opening 272 (shown in FIG. 15). Thus, the blade 294 and the protrusion 248, as well as the guide slots 252, 254, are configured as guidance features to aid in guiding the bolt 204 along the retainer 202 and toward the catch section 210.

FIGS. 17 through 20 illustrate another embodiment of a splice clip 300 according to the invention, as also can be attached to and join discrete sections of wire mesh cable tray (for example, the first and second discrete sections of mesh cable tray 10, 20 shown in FIG. 49). In many aspects, the splice clip 300 is similar to the splice clip 100 described above and similar numbering in the 300 series is used for the splice clip 300. For example, the splice clip 300 includes a retainer 302 with a pre-stage section 306 with guidance features configured as first and second guide slots 344, 346; a mid-section 308 with a guidance feature configured as a bridge 322; a catch section 310 with guidance features configured as third and fourth guide slots 352, 354 and a catch 356; and first and second pockets 382, 386. Further, the splice clip 300 includes a bolt 304 with a handle 380 and a bolt body 360 with a tab 376 extending therefrom. Further, the splice clip 300 is configured to retain wires from two discrete sections of wire mesh cable tray within the first and second pockets 382, 386 and held therein with the bolt 304 when the bolt 304 is in a closed position with the tab 376 extending within and abutting an edge of the fourth guide slot 354 (shown in FIGS. 18 through 20).

In some aspects, however, the splice clips 100, 300 differ from each other. For example, the bolt body 360 is formed to be substantially planar without any additional features, such as, for example, opposing ledges for added rigidity. Further, the bolt body 360 has only one tab 376, which is configured to engage with the edge of the fourth guide slot 354 when in the closed position.

Figure 21:
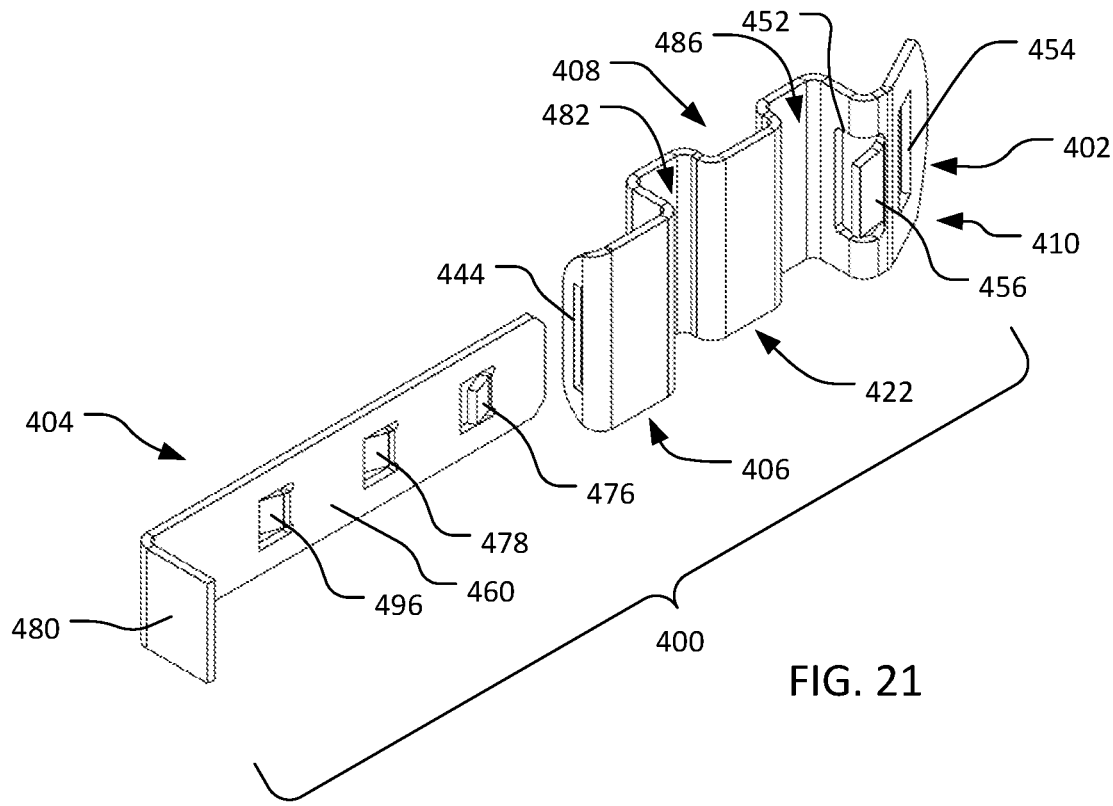
FIG. 21 is a top front left exploded isometric view of a splice clip according to another embodiment of the invention.
Figure 22:
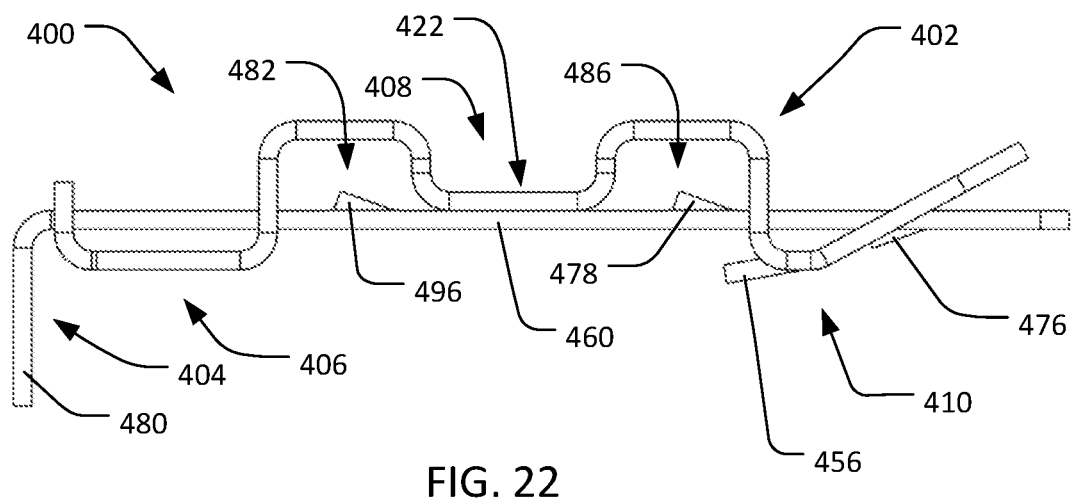
FIG. 22 is a top plan view of the splice clip of FIG. 21 in a closed position.
Figure 23:
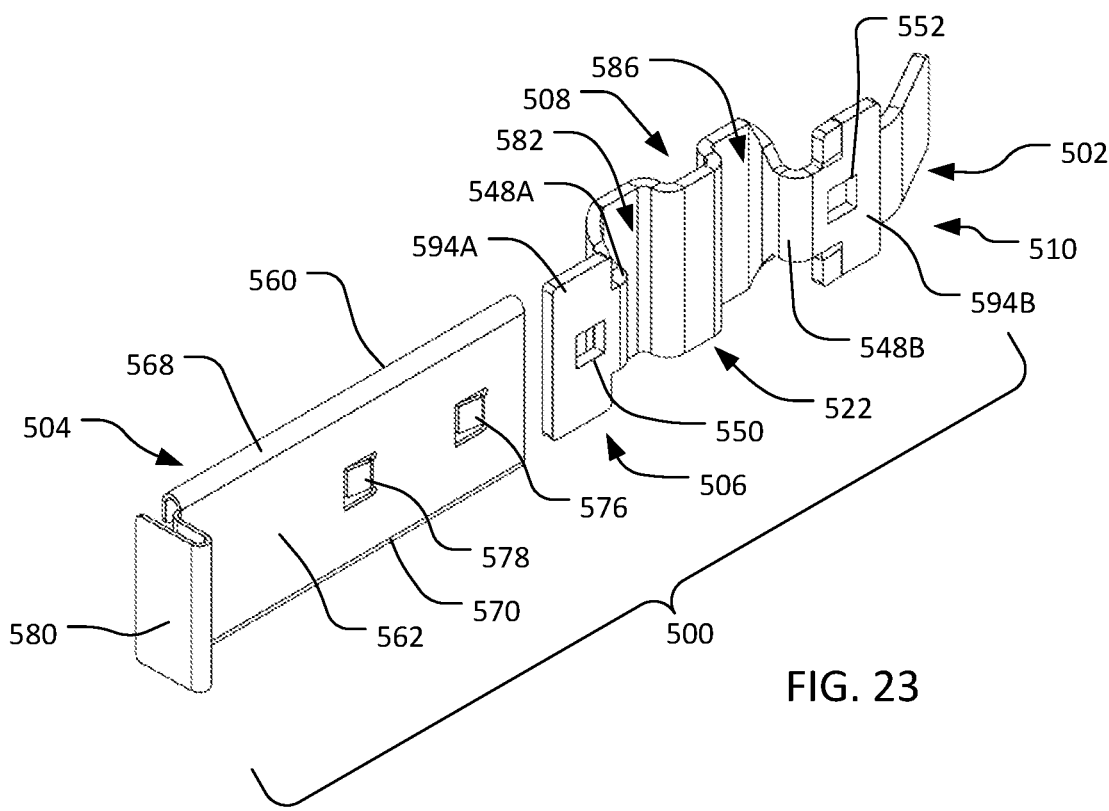
FIG. 23 is a top front left exploded isometric view of a splice clip according to another embodiment of the invention.
Figure 24:
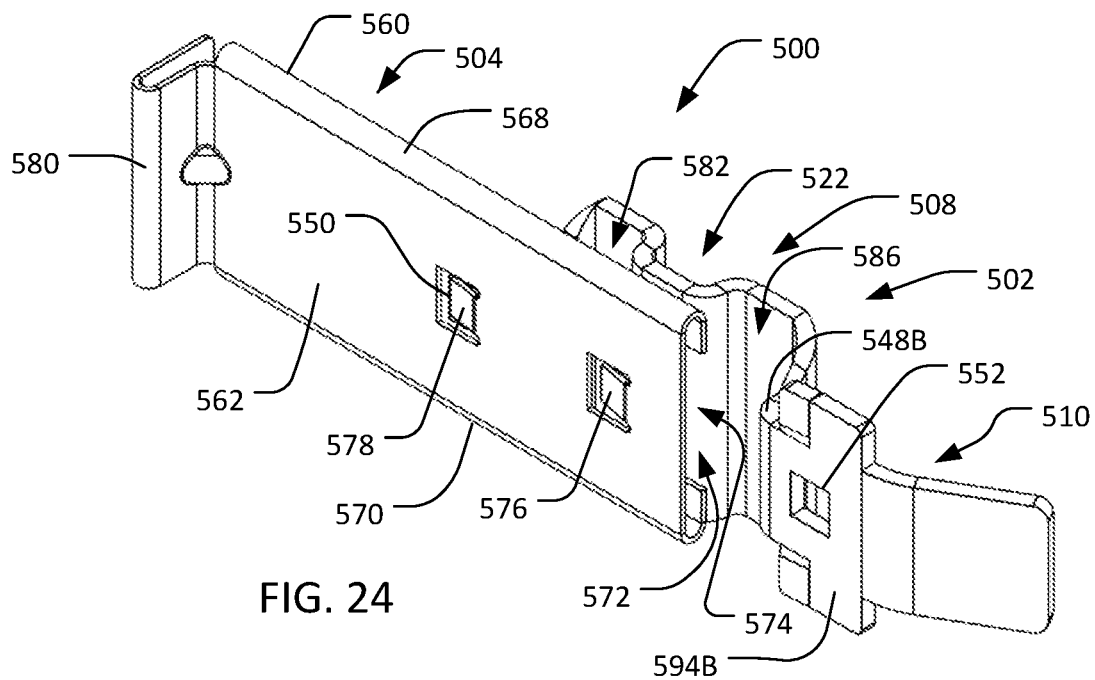
FIG. 24 is a top front right isometric view of the splice clip of FIG. 23 in the second position.
Figure 25:
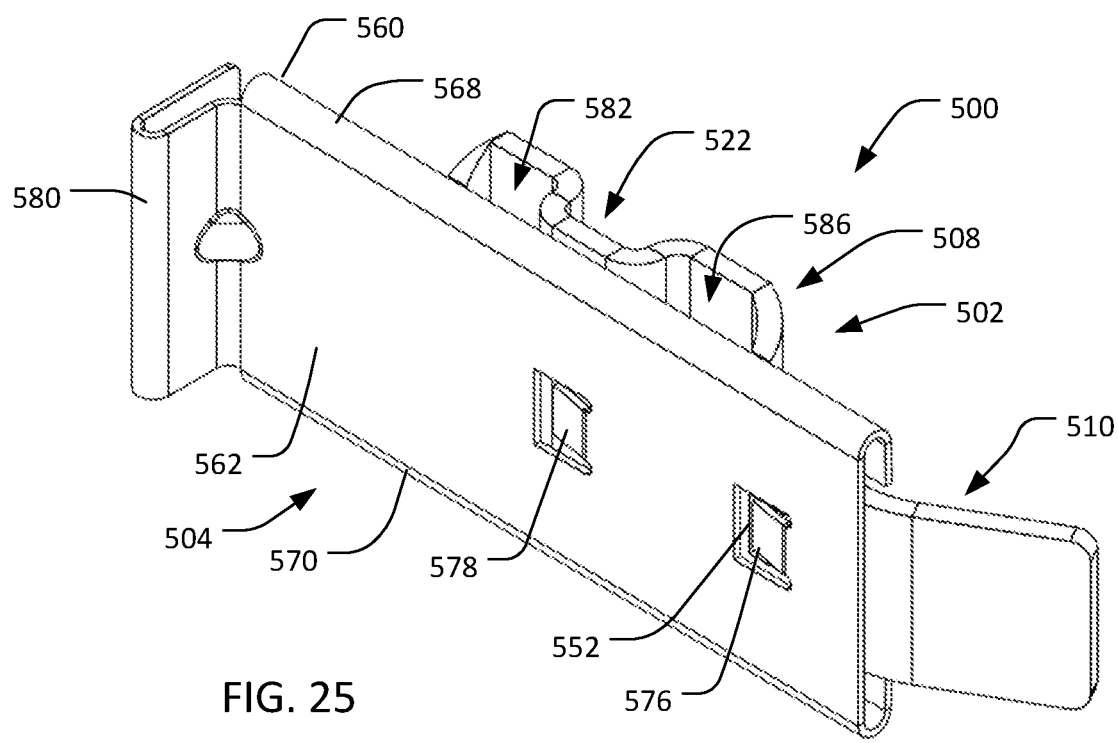
FIG. 25 is a top front right isometric view of the splice clip of FIG. 23 in the closed position.
Figure 26:
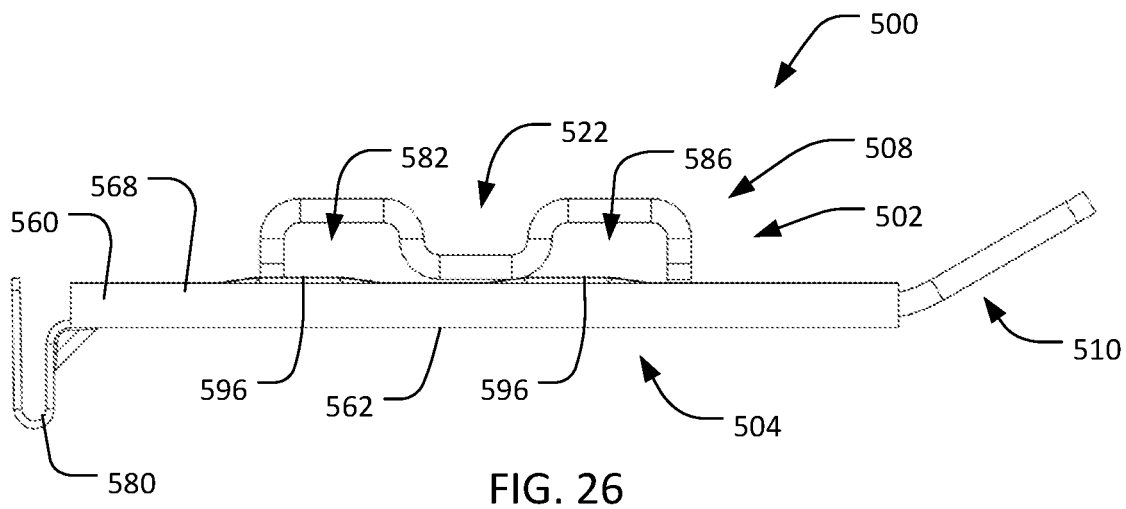
FIG. 26 is a top plan view of the splice clip of FIG. 23 in the closed position.
Figure 27:
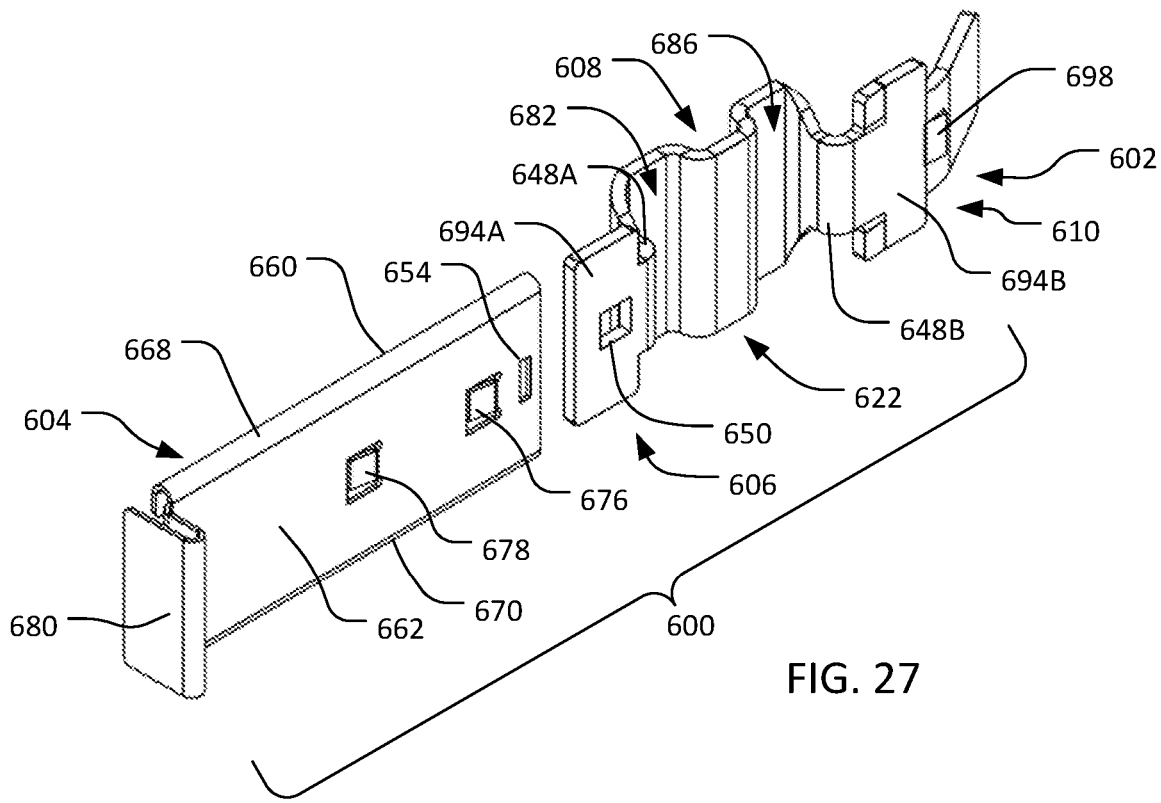
FIG. 27 is a top front left exploded isometric view of a splice clip according to another embodiment of the invention.
Figure 28:
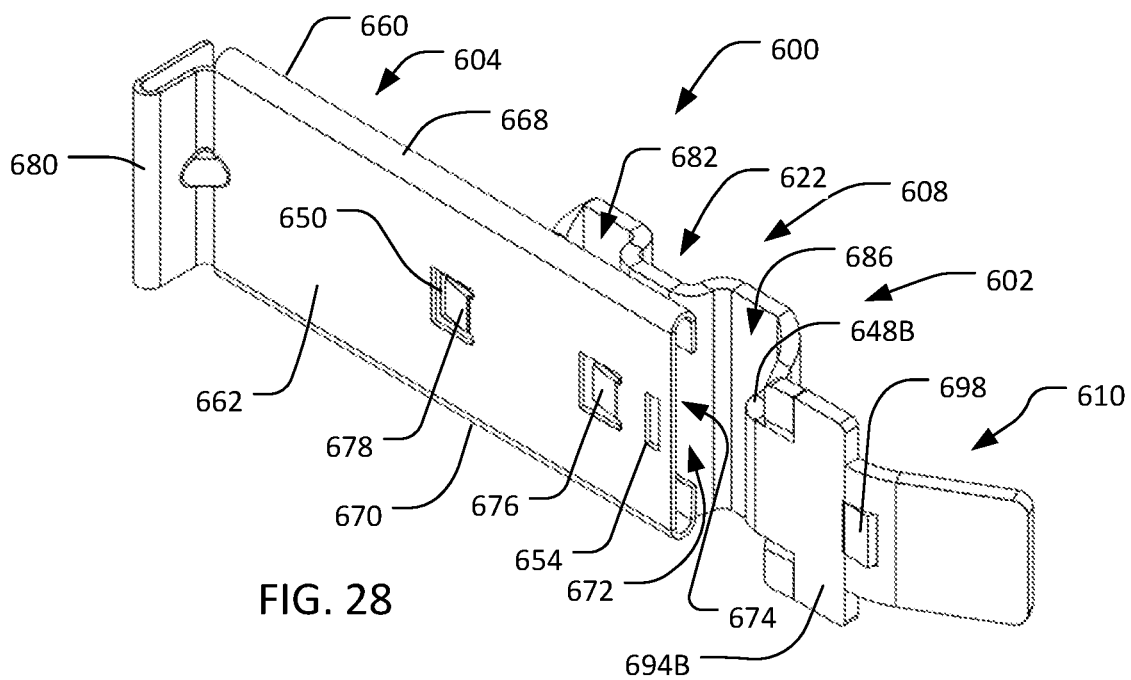
FIG. 28 is a front right isometric view of the splice clip of FIG. 27 in the second position.
Figure 29:
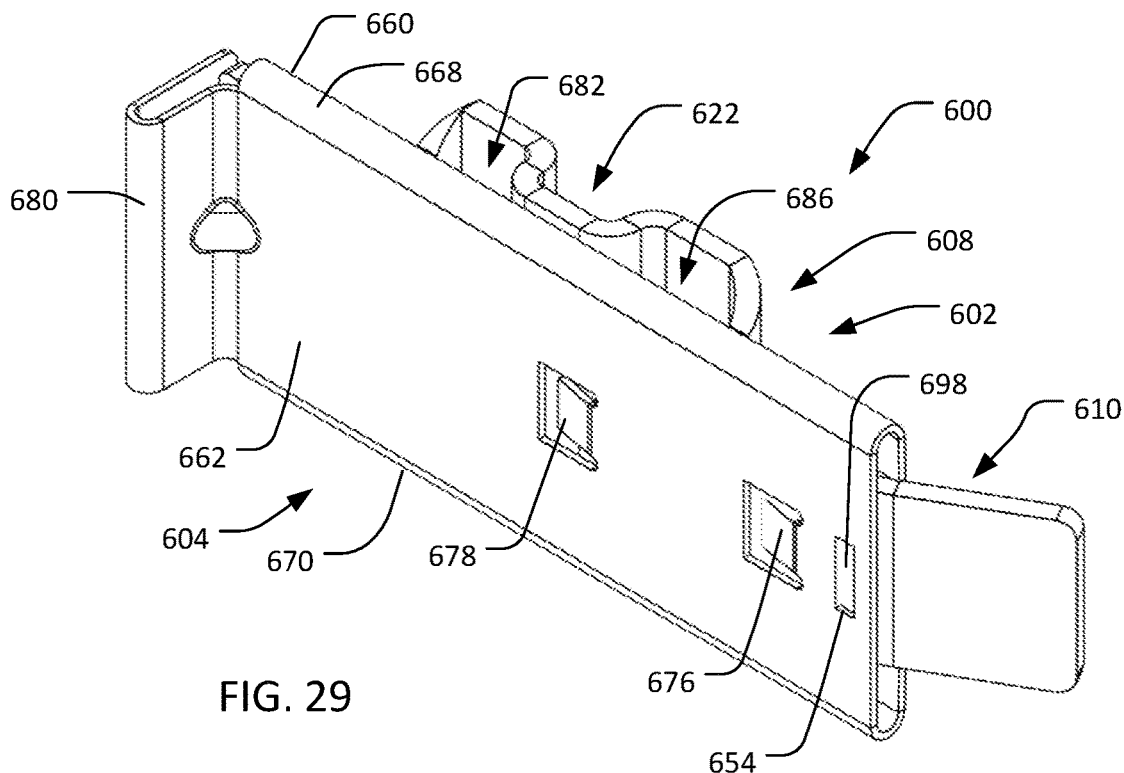
FIG. 29 is a top front right isometric view of the splice clip of FIG. 27 in the closed position.
Figure 30:
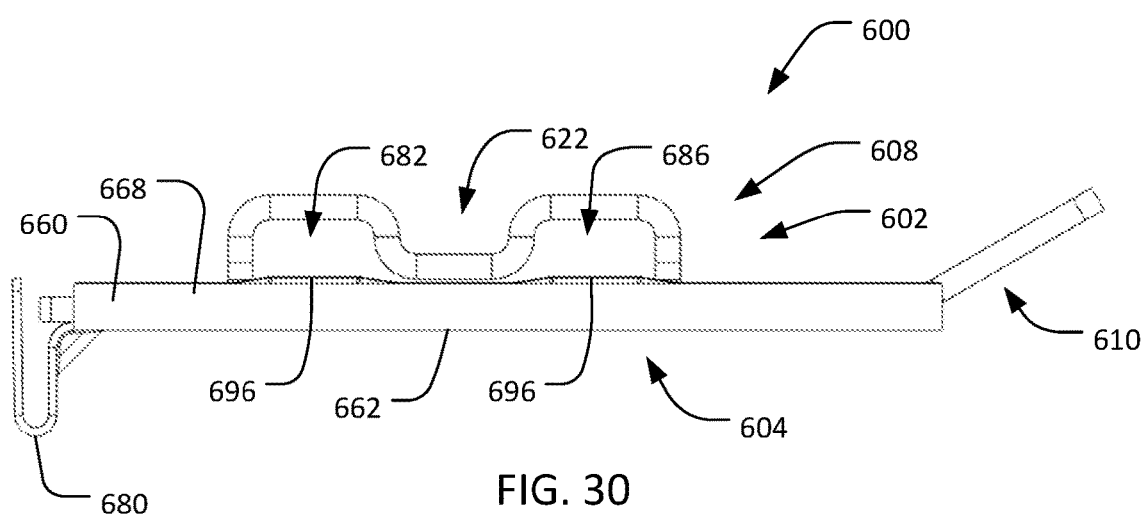
FIG. 30 is a top plan view of the splice clip of FIG. 27 in the closed position.
Figure 31:
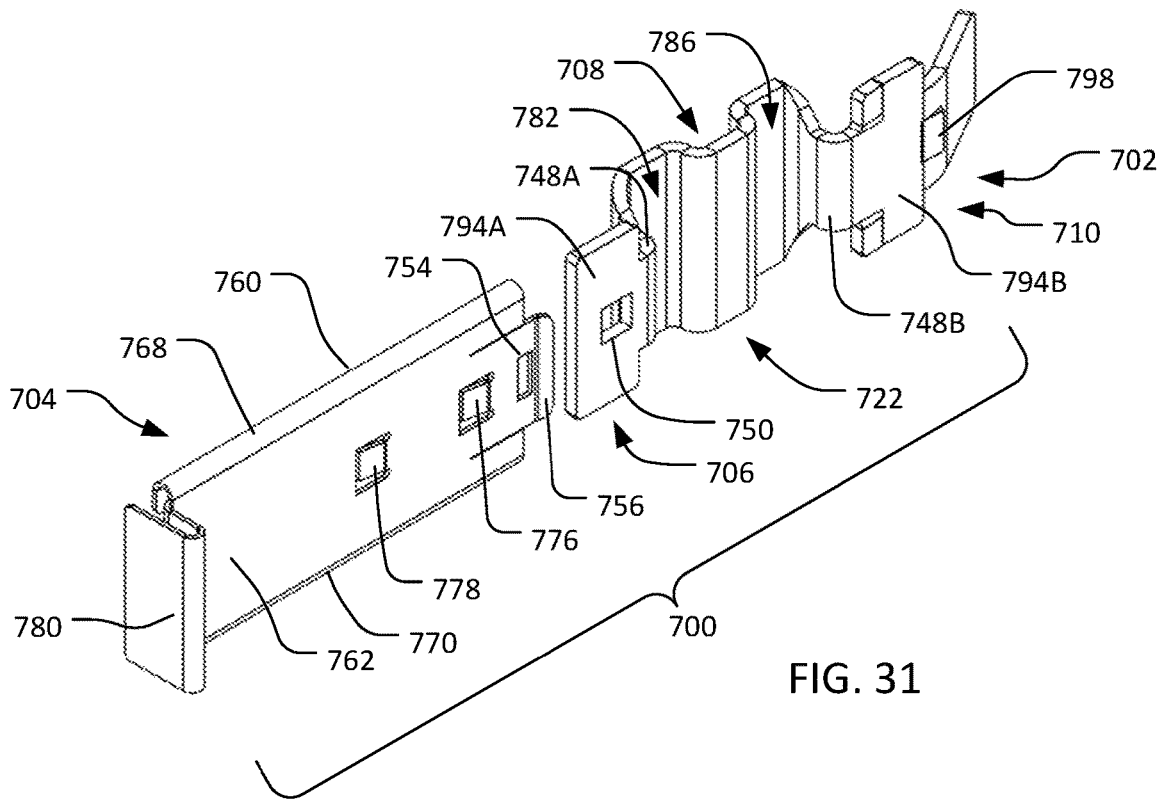
FIG. 31 is a top front left exploded isometric view of a splice clip according to another embodiment of the invention.
Figure 32:
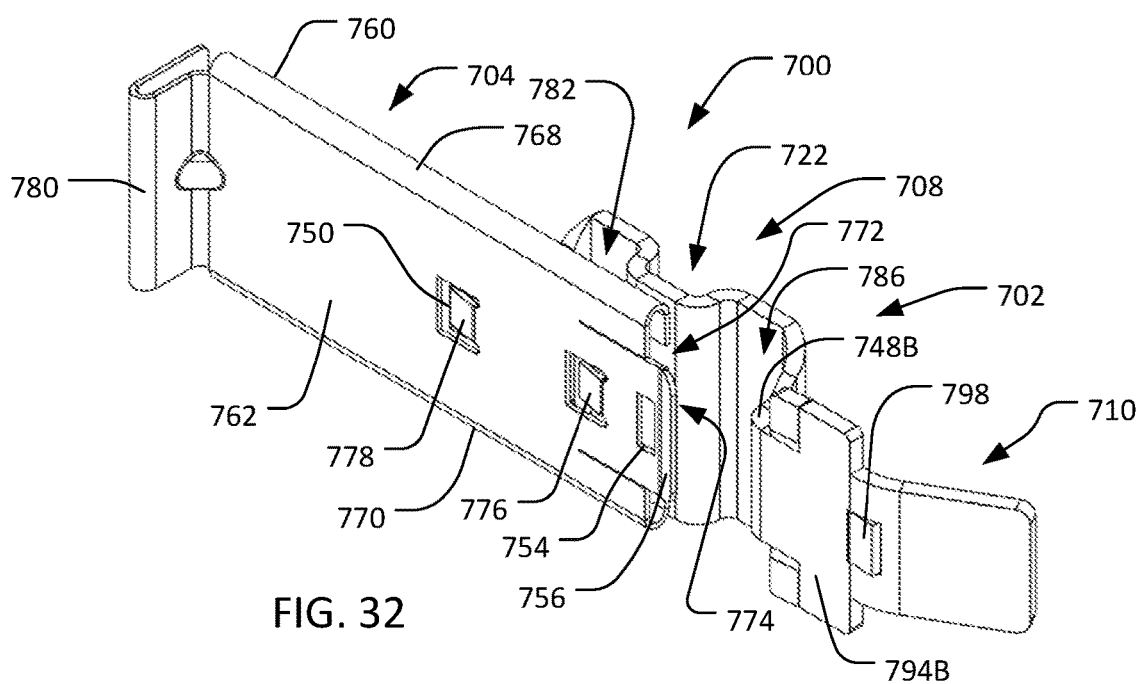
FIG. 32 is a top front right isometric view of the splice clip of FIG. 31 in the second position.
Figure 33:
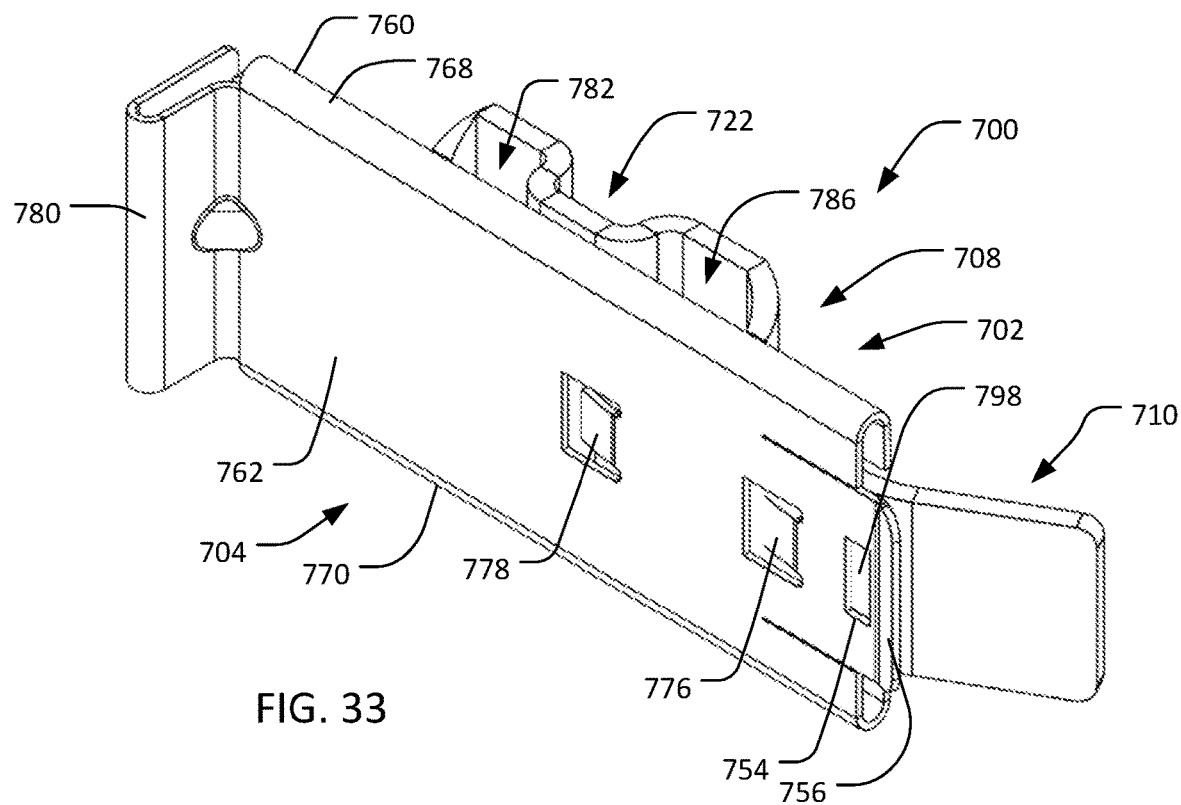
FIG. 33 is a top front right isometric view of the splice clip of FIG. 31 in the closed position.
Figure 34:
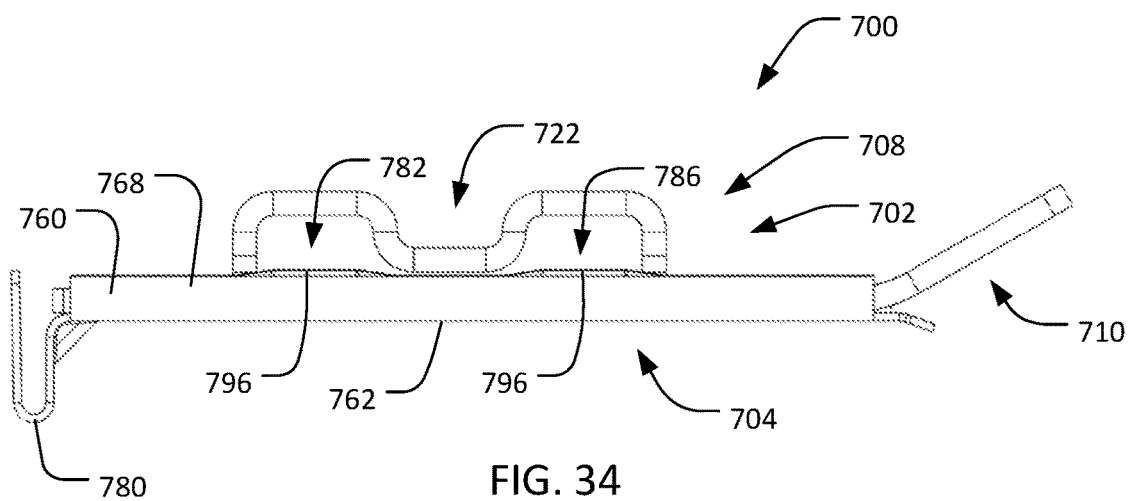
FIG. 34 is a top plan view of the splice clip of FIG. 31 in the closed position.
Figure 35:
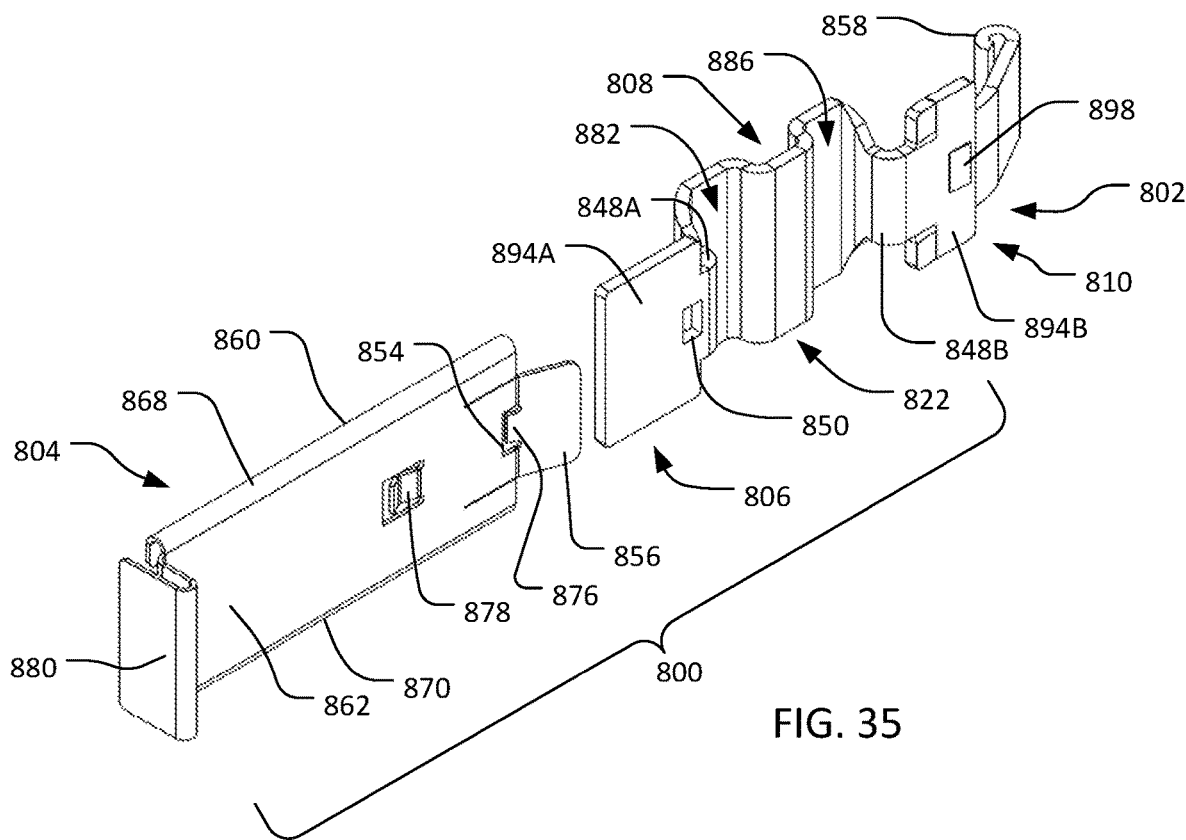
FIG. 35 is a top front left exploded isometric view of a splice clip according to another embodiment of the invention.
Figure 36:
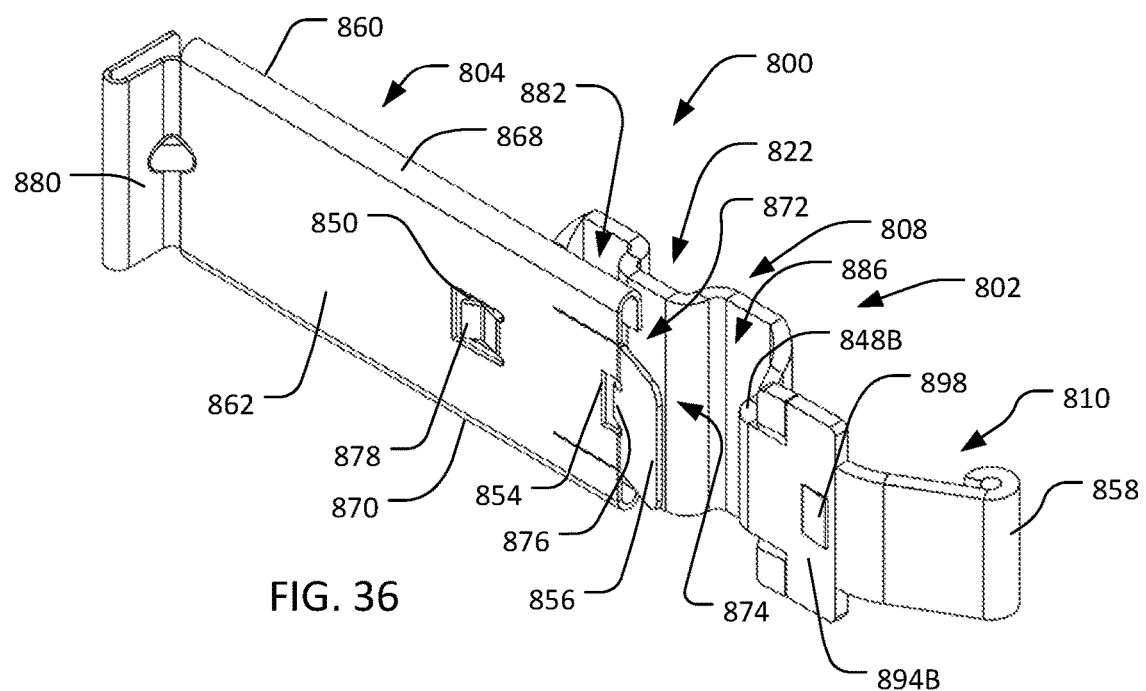
FIG. 36 is a top front right isometric view of the splice clip of FIG. 35 in the second position.
Figure 37:
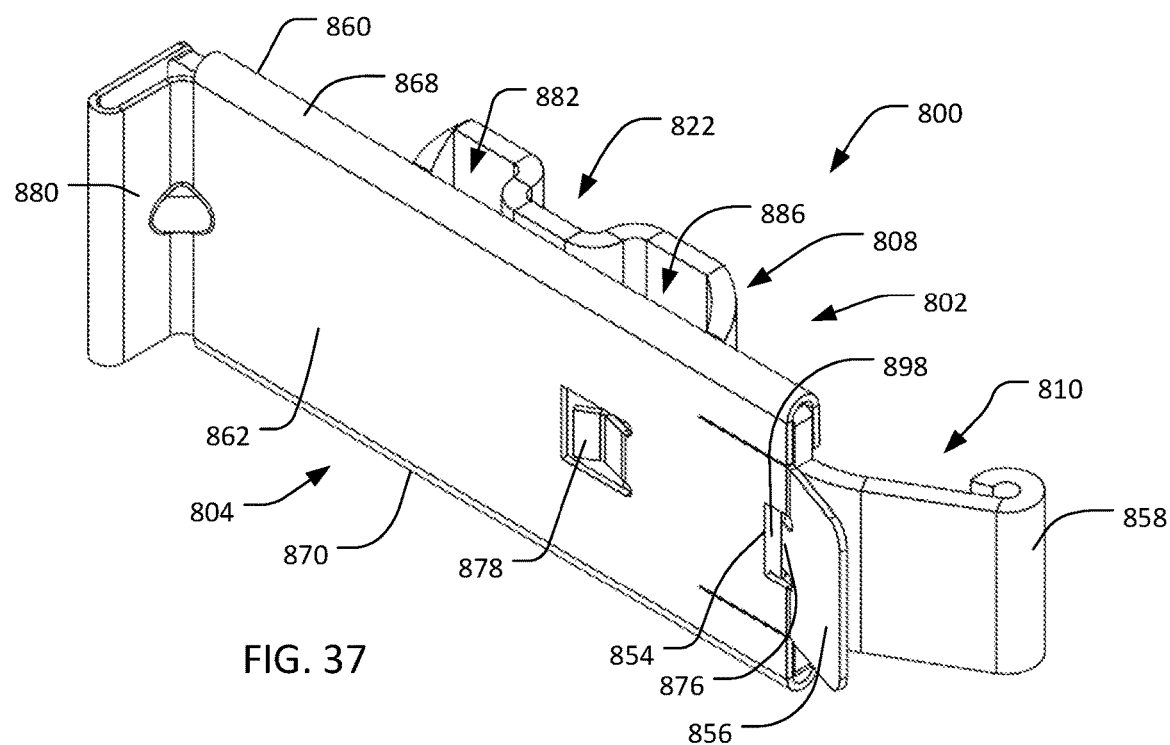
FIG. 37 is top front right isometric view of the splice clip of FIG. 35 in the closed position.

FIGS. 21 and 22 illustrate another embodiment of a splice clip 400 according to the invention, as also can be attached to and join discrete sections of wire mesh cable tray (for example, the first and second discrete sections of mesh cable tray 10, 20 shown in FIG. 49). In many aspects, the splice clip 400 is similar to the splice clip 300 described above, including with respect to various guidance features, and similar numbering in the 400 series is used for the splice clip 400. For example, the splice clip 400 includes a retainer 402 with a pre-stage section 406 with a first guide slot 444 and a second guide slot (hidden); a mid-section 408 with a bridge 422; a catch section 410 with third and fourth guide slots 452, 454 and a catch 456; and first and second pockets 482, 486. Further, the splice clip 400 includes a bolt 404 with a handle 480 and a bolt body 460 with a first tab 476 extending therefrom. Further, the splice clip 400 is configured to retain wires from two discrete sections of wire mesh cable tray within the first and second pockets 482, 486 and held therein with the bolt 404 when the bolt 404 is in a closed position with the first tab 476 extending within and abutting an edge of the fourth guide slot 454 (shown in FIG. 22).

In some aspects, however, the splice clips 300, 400 differ from each other. For example, the bolt body 460 further includes a second tab 478 and a third tab 496 extending obliquely from the bolt body 460 in a direction opposite that of the first tab 476. The second and third tabs 478, 496 are configured to urge the wires of the cable mesh trays received within the first and second pockets 482, 486 against and between the retainer 402 and the second and third tabs 478, 496 to enhance the engagement thereof with the bolt 404 and the retainer 402 when in the closed position.

FIGS. 23 through 26 illustrate another embodiment of a splice clip 500 according to the invention, as also can be attached to and join discrete sections of wire mesh cable tray (for example, the first and second discrete sections of mesh cable tray 10, 20 shown in FIG. 49). In many aspects, the splice clip 500 is similar to the splice clip 200 described above, including with respect to various guidance features, and similar numbering in the 500 series is used for the splice clip 500. For example, the splice clip 500 includes a retainer 502 with a pre-stage section 506 with a blade (here the first blade 594A) extending from a protrusion 548; a mid-section 508 with a bridge 522; and first and second pockets 582, 586. Further, the splice clip 500 includes a bolt 504 with a handle 580 and a bolt body 560 having first and second opposing ledges 568, 570 extending from a base 562 and defining an opening 572 and a passageway 574 that extends within and along the bolt body 560. Additionally, the blade 594 is configured to translate within the passageway 574, between the base 562 and the first and second opposing ledges 568, 570, of the bolt 504. Further, the splice clip 500 is configured to retain wires from two discrete sections of wire mesh cable tray within the first and second pockets 582, 586 and held therein with the bolt 504 when the bolt 504 is in a closed position (shown in FIGS. 25 and 26).

Figure 40:
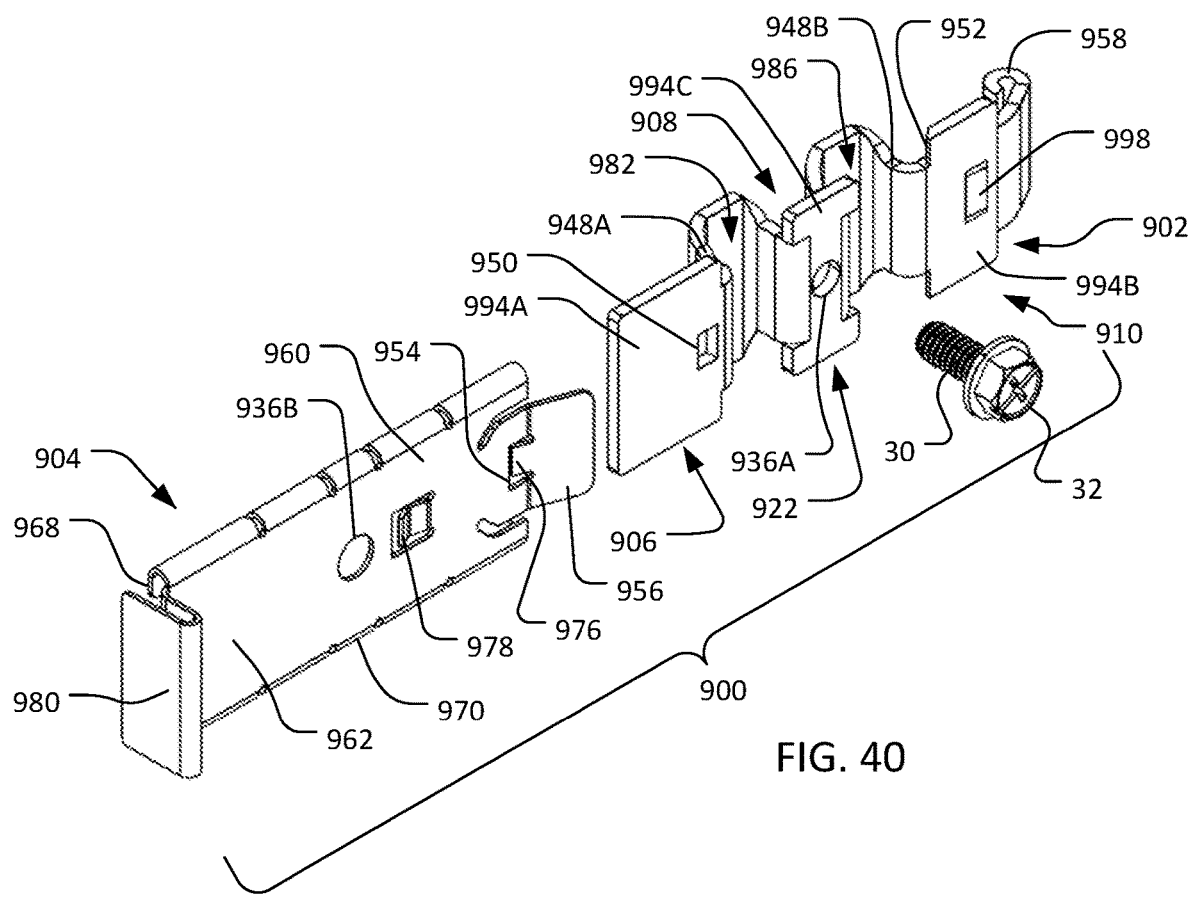
FIG. 40 is a front left exploded isometric view of a splice clip according to another embodiment of the invention.
Figure 41:
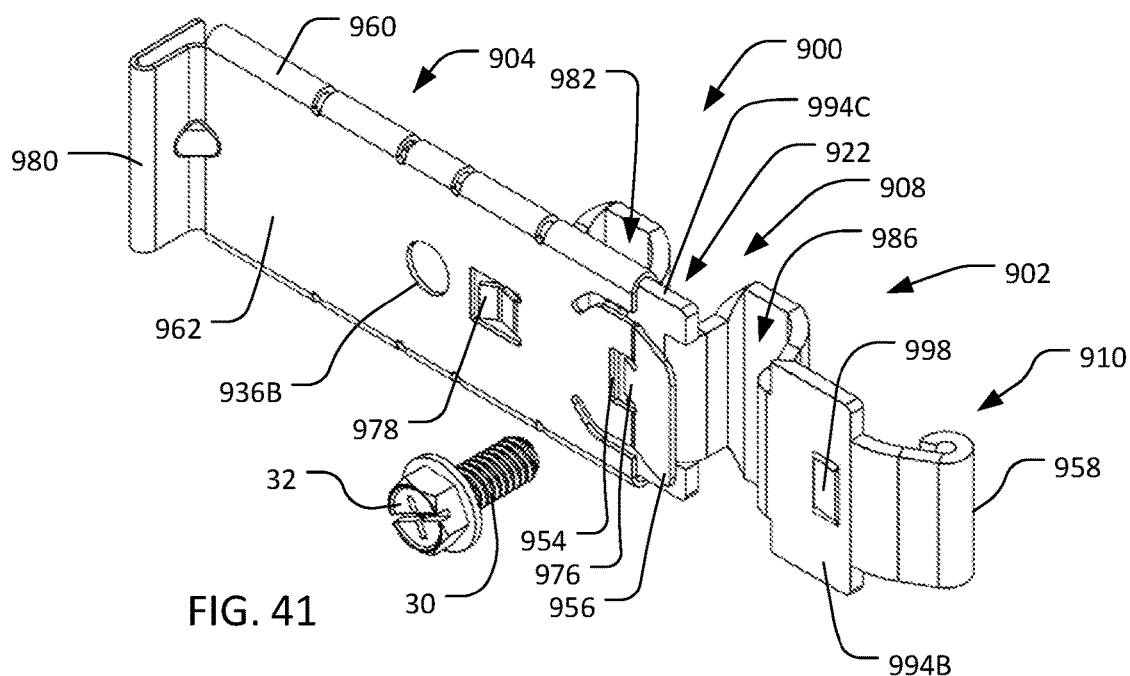
FIG. 41 is a top front right isometric view of the splice clip of FIG. 40 in the second position.
Figure 42:
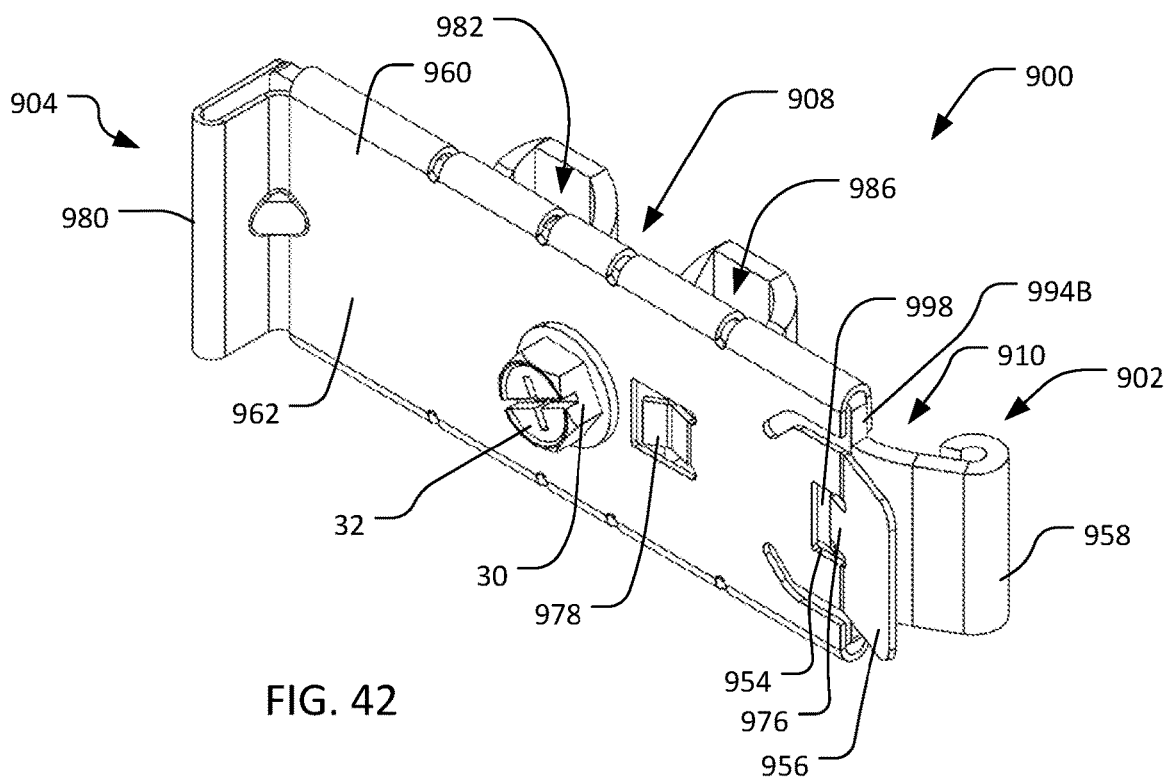
FIG. 42 is a top front right isometric view of the splice clip of FIG. 40 in the closed position.
Figure 43:
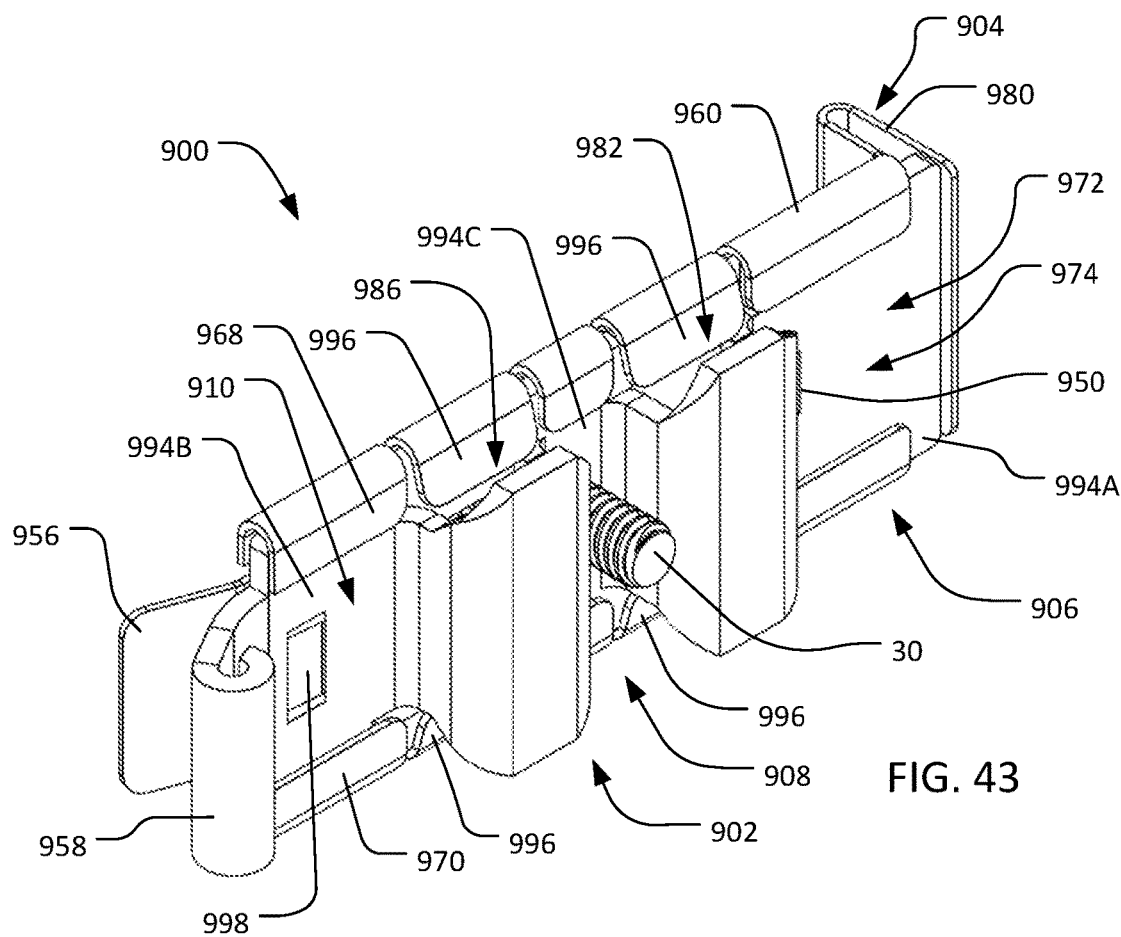
FIG. 43 is a top rear right isometric view of the splice clip of FIG. 40 in the closed position.
Figure 44:
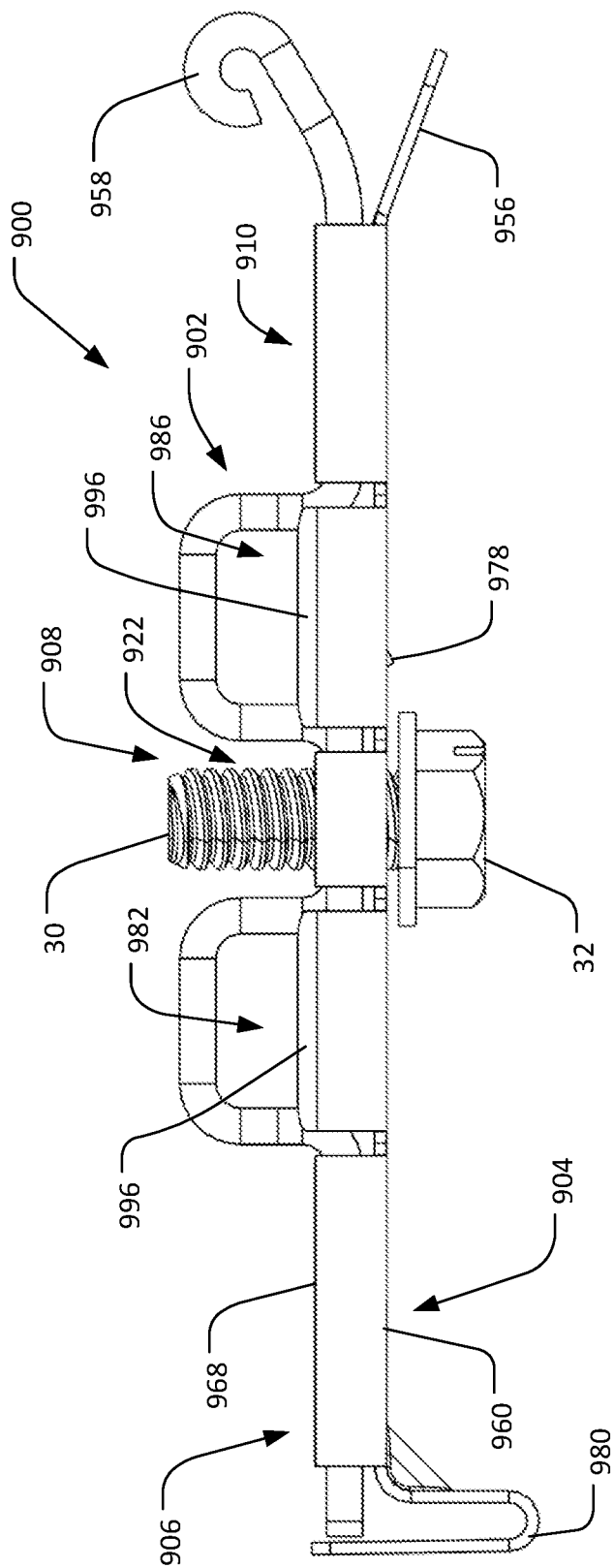
FIG. 44 is a top plan view of the splice clip of FIG. 40 in the closed position.

In some aspects, however, the splice clips 200, 500 differ from each other. For example, a catch section 510 on the retainer 502 comprises a second blade 594B extending from a second protrusion 548B. Similar to the first blade 594A, the second blade 594B is configured to translate within the passageway 574, between the base 562 and the first and second opposing ledges 568, 570, of the bolt 504. Additionally, the passageway 574 of the bolt 504, in the illustrated example, includes open-sided channels that extend in the insertion direction on opposing sides of the body 560 (relative to a direction transverse to the insertion direction). For example, as illustrated, such channels can be bounded by a C-shaped profile of the body 560. Thus, the protruding portions of the blades 594A, 594B can be slidingly received within the open-sided channels of the passageway 574 to guide movement of the bolt 504 in the insertion (or opposing) direction. As shown in FIGS. 23 through 26, channels of a bolt can be formed without breaks in some cases, whereas in other examples one or more such channels can include breaks (e.g., channels with breaks corresponding to breaks in the body 560, as illustrated in FIG. 40, including as can to provide spring structures to further secure the wires of the relevant cable trays).

Further, the first blade 594A has a first aperture 550 and the second blade 594B has a second aperture 552 therein. Correspondingly, the bolt 504 of the splice clip 500 also has a set of tabs, including a first tab 576 and a second tab 578, laterally spaced on the base 562 and extending inward therefrom into the passageway 574. The first and second tabs 576, 578 are configured to be received within the first and second apertures 550, 552, to place the splice clip 500 in various configurations. For example, with the first tab 576 in the first aperture 550 (configuration not shown), the splice clip 500 is in a first, pre-stage, configuration in which the bolt 504 is engaged with the retainer 502 with access to both the first pocket 582 and the second pocket 586. With the splice clip 500 in a second position (shown in FIG. 24), the second tab 578 is received within the first aperture 550 and the bolt 504 extends over and encloses the first pocket 582 but leaves access to the second pocket 586. Further, in the closed position (shown in FIGS. 25 and 26), the first tab 576 is received within the second aperture 552 and the bolt 504 extends over and encloses the first and second pockets 582, 586.

Figure 39A:
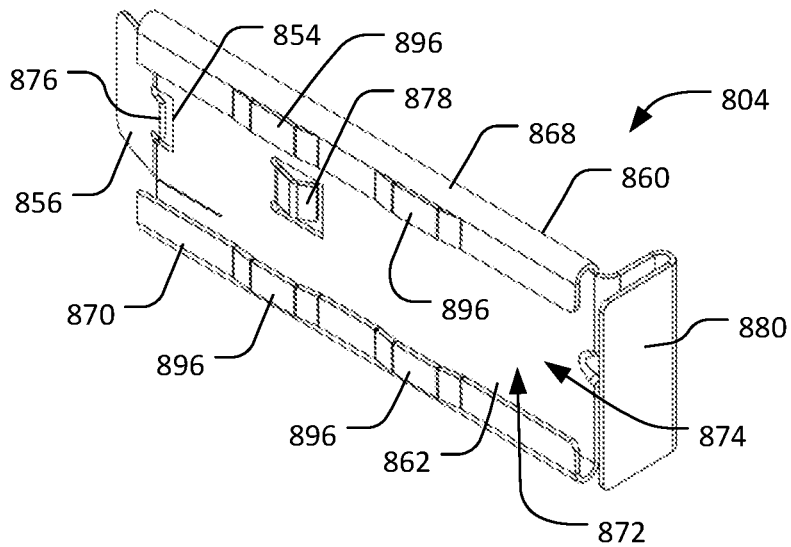
FIG. 39A is a top rear left isometric view of a bolt of the splice clip of FIG. 35 shown in isolation.

Additionally, a set of biasing elements, here shown as a pair of leaves 596, are laterally spaced along each of the first and second ledges 568, 570. The leaves 596 are integrally formed and extend outward from the respective first and second ledge 568, 570 away from the base 562. In the illustrated embodiment, and as shown in greater detail in FIG. 39A with respect to another embodiment of a bolt 804 with similar leaves, the leaves 596 are separated from the first and second ledges 568, 570 along an edge spaced from the opening 572 and bent outward along adjacent sides. The leaves 596 are thus configured to contact the wires of the cable mesh trays received within the first and second pockets 582, 586, and to urge them in a spring-like manner (i.e., resiliently) against the retainer 502. This arrangement can enhance the engagement of the clip 500 with the wires, when the clip 500 is in the closed position, and better establish and maintain electrical continuity between the various components. Other configurations of leaves are contemplated, including those shown in FIGS. 39B and 39C, and configurations with different numbers of leaves than shown (e.g., only one of the leaves 596, etc.), and this disclosure should not be construed as being limited to only these illustrated leaf configurations.

FIGS. 27 through 30 illustrate another embodiment of a splice clip 600 according to the invention, as also can be attached to and join discrete sections of wire mesh cable tray (for example, the first and second discrete sections of mesh cable tray 10, 20 shown in FIG. 49). In many aspects, the splice clip 600 is similar to the splice clip 500 described above, including with respect to various guidance features, and similar numbering in the 600 series is used for the splice clip 600. For example, the splice clip 600 includes a retainer 602 with a pre-stage section 606 with a first blade 694A extending from a first protrusion 648A and including an aperture 650; a mid-section 608 with a bridge 622; a catch section 610 with a second blade 694B extending from a second protrusion 648B; and first and second pockets 682, 686. Further, the splice clip 600 includes a bolt 604 with a handle 680 and a bolt body 660 having first and second opposing ledges 668, 670 extending from a base 662 and defining an opening 672 and a passageway 674. The ledges 668, 670 including a set of leaves 696 extending outward therefrom opposite the base 662. The bolt 604 also has a set of tabs, including a first tab 676 and a second tab 678, laterally spaced on the base 662 and extending inward therefrom into the passageway 674.

Additionally, the first and second blades 694A, 694B are configured to translate within the passageway 674, between the base 662 and the first and second opposing ledges 668, 670, of the bolt 604. Further, the splice clip 600 is configured to retain wires from two discrete sections of wire mesh cable tray within the first and second pockets 682, 686 and held therein with the bolt 604 when the bolt 604 is in a closed position (shown in FIGS. 29 and 30).

Further, the first and second tabs 676, 678 are configured to be received within the aperture 650, to place the splice clip 600 in various configurations. For example, with the first tab 676 in the aperture 650 (configuration not shown), the splice clip 600 is in a first, pre-stage, configuration in which the bolt 604 is engaged with the retainer 602 with access to both the first pocket 682 and the second pocket 686. With the splice clip 600 in a second position (shown in FIG. 28), the second tab 678 is received within the aperture 650 and the bolt 604 extends over and encloses the first pocket 682 but leaves access to the second pocket 686.

In some aspects, however, the splice clips 500, 600 differ from each other. For example, the second blade 694B of the retainer 602 does not have an aperture, instead having a retainer tab 698 extending from the catch section 610. The retainer tab 698 is configured to be received within a slot 654 in the bolt 604 with the splice clip 600 in the closed configuration (shown in FIGS. 29 and 30).

FIGS. 31 through 34 illustrate another embodiment of a splice clip 700 according to the invention, as also can be attached to and join discrete sections of wire mesh cable tray (for example, the first and second discrete sections of mesh cable tray 10, 20 shown in FIG. 49). In many aspects, the splice clip 700 is similar to the splice clip 600 described above, including with respect to various guidance features, and similar numbering in the 700 series is used for the splice clip 700. For example, the splice clip 700 includes a retainer 702 with a pre-stage section 706 with a first blade 794A extending from a first protrusion 748A and including an aperture 750; a mid-section 708 with a bridge 722; a catch section 710 with a second blade 794B extending from a second protrusion 748B and a retainer tab 798; and first and second pockets 782, 786. Further, the splice clip 700 includes a bolt 704 with a handle 780 and a bolt body 760 having first and second opposing ledges 768, 770 extending from a base 762 and defining an opening 772 and a passageway 774. The ledges 768, 770 including a set of leaves 796 extending outward therefrom opposite the base 762. The bolt 704 also has a set of tabs, including a first tab 776 and a second tab 778, laterally spaced on the base 762 and extending inward therefrom into the passageway 774 and a slot 754.

Additionally, the first and second blades 794A, 794B are configured to translate within the passageway 774, between the base 762 and the first and second opposing ledges 768, 770, of the bolt 704. Further, the splice clip 700 is configured to retain wires from two discrete sections of wire mesh cable tray within the first and second pockets 782, 786 and held therein with the bolt 704 when the bolt 704 is in a closed position (shown in FIGS. 33 and 34).

Further, the first and second tabs 776, 778 are configured to be received within the aperture 750, to place the splice clip 700 in various configurations. For example, with the first tab 776 in the aperture 750 (configuration not shown), the splice clip 700 is in a first, pre-stage, configuration in which the bolt 704 is engaged with the retainer 702 with access to both the first pocket 782 and the second pocket 786. With the splice clip 700 in a second position (shown in FIG. 31), the second tab 778 is received within the aperture 750 and the bolt 704 extends over and encloses the first pocket 782 but leaves access to the second pocket 786. Additionally, in the closed position (shown in FIGS. 33 and 34), the retainer tab 798 of the retainer 702 is received within the slot 754 of the bolt 704, with the bolt 704 extending over and enclosing the first and second pockets 782, 786.

In some aspects, however, the splice clips 600, 700 differ from each other. For example, the bolt 704 includes a tab release 756 opposite the handle 780. With the splice clip 700 in the closed configuration, the tab release 756 can be pulled away from the retainer 702, removing the retainer tab 798 from the slot 754 of the bolt 704. The bolt 704 can then translate in reverse of the installation direction relative to the retainer 702 permitting the bolt 704 to move back to the second position (shown in FIG. 31), allowing access to the second pocket 786, and permitting removal of a wire from one of two discrete wire trays therefrom.

FIGS. 35 through 38 illustrate another embodiment of a splice clip 800 according to the invention, as also can be attached to and join discrete sections of wire mesh cable tray (for example, the first and second discrete sections of mesh cable tray 10, 20 shown in FIG. 49). In many aspects, the splice clip 800 is similar to the splice clip 700 described above, including with respect to various guidance features, and similar numbering in the 800 series is used for the splice clip 800. For example, the splice clip 800 includes a retainer 802 with a pre-stage section 806 with a first blade 894A extending from a first protrusion 848A and including an aperture 850; a mid-section 808 with a bridge 822; a catch section 810 with a second blade 894B extending from a second protrusion 848B and a tab 898; and first and second pockets 882, 886. Further, the splice clip 800 includes a bolt 804 (also shown in isolation in FIG. 39A) with a handle 880 and a bolt body 860 having first and second opposing ledges 868, 870 extending from a base 862 and defining an opening 872 and a passageway 874. The ledges 868, 870 including a set of leaves 896 extending outward therefrom opposite the base 862. The bolt 804 also has a first tab 876, a second tab 878 extending inward from the bolt body 860 into the passageway 874, a slot 854, and a tab release 856.

Additionally, the first and second blades 894A, 894B are configured to translate within the passageway 874, between the base 862 and the first and second opposing ledges 868, 870, of the bolt 804. Further, the splice clip 800 is configured to retain wires from two discrete sections of wire mesh cable tray within the first and second pockets 882, 886 and held therein with the bolt 804 when the bolt 804 is in a closed position (shown in FIGS. 37 and 38).

Further, the first and second tabs 876, 878 are configured to be received within the aperture 850, to place the splice clip 800 in various configurations. For example, with the first tab 876 in the aperture 850 (configuration not shown), the splice clip 800 is in a first, pre-stage, configuration in which the bolt 804 is engaged with the retainer 802 with access to both the first pocket 882 and the second pocket 886. With the splice clip 800 in a second position (shown in FIG. 36), the second tab 878 is received within the aperture 850 and the bolt 804 extends over and encloses the first pocket 882 but leaves access to the second pocket 886. Additionally, in the closed position (shown in FIGS. 37 and 38), the tab 898 of the retainer 802 is received within the slot 854 of the bolt 804, with the bolt 804 extending over and enclosing the first and second pockets 882, 886.

Figure 38:
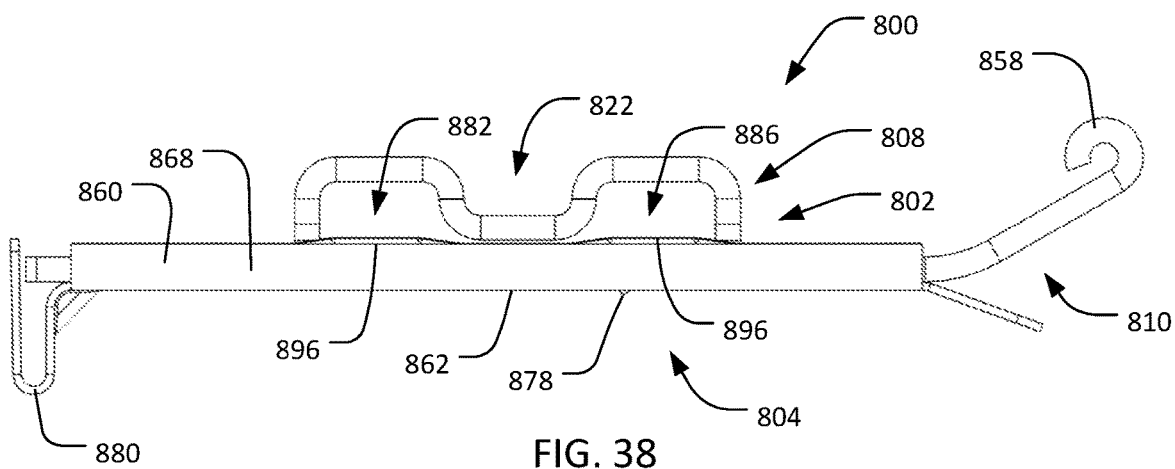
FIG. 38 is a top plan view of the splice clip of FIG. 35 in the closed position.

In some aspects, however, the splice clips 700, 800 differ from each other. For example, the first tab 876 of the bolt 804 extends inward from the slot 854, into the passageway 874 and in the direction of the handle 880. With the splice clip 800 in the closed position, the first tab 876 engages with the retainer tab 898 to prevent movement of the bolt 804 back toward the second position. Similar to the slice clip 700, however, the tab release 856 can be pulled away from the retainer 802 to remove the tab 898 of the retainer 802 from the slot 854 but this movement will also disengage the engagement of the retainer tab 898 and the first tab 876 of the bolt 804. As shown in FIG. 38, with the splice clip 800 in the closed position, the handle 880 abuts against the first blade 894A, providing another indication (e.g., tactile or visual) to the operator that the bolt 804 is engaged with the retainer 802 in the closed position and preventing translation of the bolt 804 beyond the closed position.

Additionally, the second tab 878 of the bolt 804 is formed with a partial return bend, which angles the distal portion of the second tab 878 back toward the bolt body 860 (and away from the retainer 802, when installed). With the tab release 856 pulled away from the retainer 802, the partial return bend in the second tab 878 permits the second tab 878 to exit the aperture 850 as the bolt 804 is translated in reverse of the installation direction relative to the retainer 802, permitting the bolt 804 to be fully separated from the retainer 802.

Further, the catch section 810 terminates at a curved or rounded terminal end 858. The rounded terminal end 858 provides a smooth surface that, when the retainer 802 is installed on a discrete section of wire cable tray 10 (shown in FIG. 45), does not damage cables, wires, or the like that are pulled there along or placed there against.

Figure 39B:
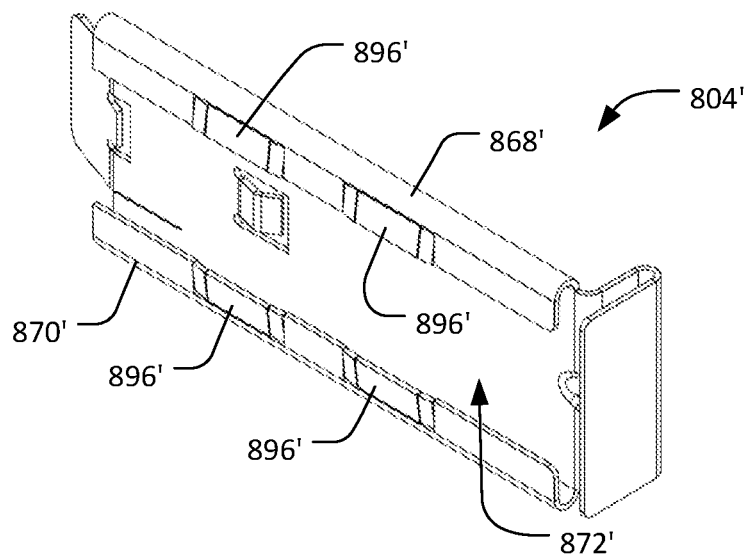
FIGS. 39B and 39C are top rear left isometric views of bolts for combination with a retainer of the splice clip of FIG. 35 according to other embodiments of the invention.
Figure 39C:
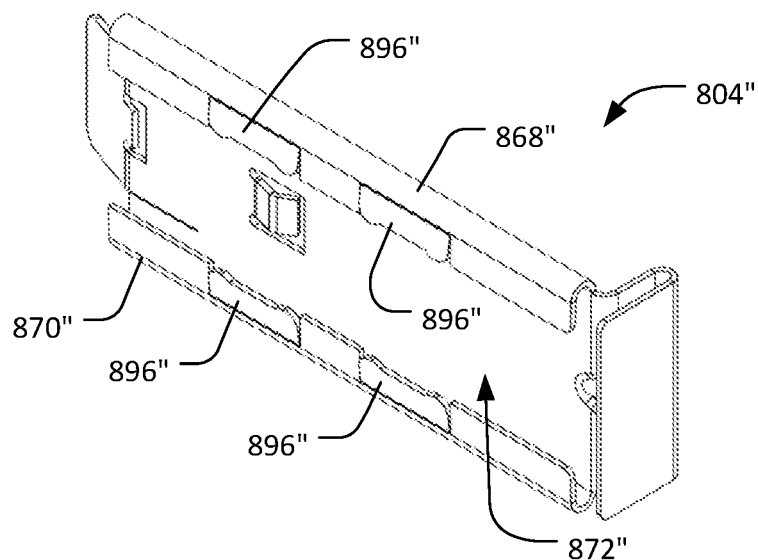

FIGS. 39B and 39C show other configurations of leaves according to embodiments of the invention. FIG. 39B illustrates a bolt 804' with leaves 896' separated from the first and second ledges 868', 870' along lateral edges and partially along an edge spaced from the opening 872' adjacent the lateral edges to define lateral sides. The leaves 896' are bent outward along the edge spaced from the opening 872' to provide the spring-like characteristic. The lateral sides are bent back toward the opening 872' to provide an angled contact surface with which to contact the wires of the cable tray to case the translation of the bolt 804' there across. FIG. 39C illustrates a bolt 804" with leaves 896" separated from the first and second ledges 868", 870" along lateral edges and bent outward along an edge spaced from the opening 872". The distal edge of each of the leaves 896" is notched to receive at least a portion of a wire of the cable tray to nest therein.

FIGS. 40 through 44 illustrate another embodiment of a splice clip 900 according to the invention, as also can be attached to and join discrete sections of wire mesh cable tray (for example, the first and second discrete sections of mesh cable tray 10, 20 shown in FIG. 49). In many aspects, the splice clip 900 is similar to the splice clip 800 described above, including with respect to various guidance features, and similar numbering in the 900 series is used for the splice clip 900. For example, the splice clip 900 includes a retainer 902 with a pre-stage section 906 with a first blade 994A extending from a first protrusion 948A and including an aperture 950; a mid-section 908 with a bridge 922; a catch section 910 with a second blade 994B extending from a second protrusion 948B and a tab 998; and first and second pockets 982, 986. Further, the splice clip 900 includes a bolt 904 with a handle 900 and a bolt body 960 having first and second opposing ledges 968, 970 extending from a base 962 and defining an opening 972 and a passageway 974. The ledges 968, 970 including a set of leaves 996 extending outward therefrom opposite the base 962. The bolt 904 also has a first tab 976, a second tab 978 extending inward from the bolt body 960 into the passageway 974, a slot 954, and a tab release 956.

Additionally, the first and second blades 994A, 994B are configured to translate within the passageway 974, between the base 962 and the first and second opposing ledges 968, 970, of the bolt 904. Further, the splice clip 900 is configured to retain wires from two discrete sections of wire mesh cable tray within the first and second pockets 982, 986 and held therein with the bolt 904 when the bolt 904 is in a closed position (shown in FIGS. 42 through 44).

Further, the first and second tabs 976, 978 are configured to be received within the aperture 950, to place the splice clip 900 in various configurations. For example, with the first tab 976 in the aperture 850 (configuration not shown), the splice clip 900 is in a first, pre-stage, configuration in which the bolt 904 is engaged with the retainer 902 with access to both the first pocket 982 and the second pocket 986. With the splice clip 900 in a second position (shown in FIG. 41), the second tab 978 is received within the aperture 950 and the bolt 904 extends over and encloses the first pocket 982 but leaves access to the second pocket 986. Additionally, in the closed position (shown in FIGS. 42 through 44), the tab 998 of the retainer 902 is received within the slot 954 of the bolt 904, with the bolt 904 extending over and enclosing the first and second pockets 982, 986.

Additionally, the first tab 976 of the bolt 904 extends inward from the slot 954, into the passageway 974 and in the direction of the handle 980. With the splice clip 900 in the closed position, the first tab 976 engages with the retainer tab 998 to prevent movement of the bolt 904 back toward the second position. The tab release 956 is configured to be pulled away from the retainer 902 to remove the tab 998 of the retainer 902 from the slot 854. Pulling the tab release 956 away from the retainer 902 will also disengage the first tab 976 of the bolt 804 from the retainer tab 998 allowing the bolt 804 to be translated in reverse of the installation direction relative to the retainer 902 (i.e., translated back toward the second position).

Moreover, the second tab 978 of the bolt 904 is formed with a partial return bend, which angles the distal portion of the second tab 978 back toward the bolt body 960. With the tab release 956 pulled away from the retainer 902, the partial return bend in the second tab 978 permits the second tab 978 to exit the aperture 950 as the bolt 904 is translated in reverse of the installation direction relative to the retainer 902, permitting the bolt 904 to be fully separated from the retainer 902.

Further, the catch section 910 terminates at a curved or rounded terminal end 958. The rounded terminal end 958 provides a smooth surface that, when the retainer 902 is installed on a discrete section of wire cable tray 10 (shown in FIG. 45), does not damage cables, wires, or the like that are pulled there along or placed there against.

In some aspects, however, the splice clips 800, 900 differ from each other. For example, the bridge 922 includes a third blade 994C extending therefrom and configured to translate within the passageway 974, between the base 962 and the first and second opposing ledges 968, 970, of the bolt 904. With the bolt 904 translating from the second position (shown in FIG. 41) to the closed position (FIGS. 42 through 44), the third blade 994C maintains the engagement between the bolt 904 and the retainer 902 and ensures the bolt 904 continues toward the second blade 994B without being urged out of alignment by a wire received within the first pocket 982. Moreover, the second blade 994B can be formed with chamfered edges 952 (shown in FIG. 40) to further aid in engaging first and second opposing edges 968, 970 of the bolt 904 as the bolt 904 translates along the retainer 902 to the closed position from the second position.

Additionally, the splice clip 900 includes features to accept a ground screw (e.g., a ground screw 30 shown in FIGS. 40 through 44) therein. The retainer 902 has a threaded hole 936A extending through the bridge 922 and the bolt 904 has an aperture 936B extending through the base 962. With the splice clip 900 in the closed position (shown in FIGS. 42 through 44), the aperture 936B is aligned with the threaded hole 936A. The ground screw 30 can then be inserted through the aperture 936B and threadably engaged with the threaded hole 936A. Tightening the ground screw 30 can further enhance the electrical continuity between the retainer 902 and the bolt 904. Additionally, an equipment grounding conductor (not shown) connected to the cable tray system (for example, connected and extending from one or both of the first and second discrete sections of mesh cable tray 10, 20 shown in FIG. 49) can be retained between a head 32 of the ground screw 20 and the bolt 904 to connect the normally non-current-carrying metal parts of the first and second discrete sections of the mesh cable tray 10, 20 together and to a system grounded conductor (not shown), the grounding electrode conductor (not shown), or both. Similarly configured ground screws can also be included in other examples presented herein. It should be understood that the terms "ground" or "grounding" is also used in this application to mean "bond" or "bonding," respectively. For example, a ground screw, such as the ground screw 30, can also be installed through the aperture 936B and into the threaded hole 936A and can retain a bonding jumper as part of a bonding system to bond conductive parts of the nearby system and place them at the same electrical potential.

Figure 45:
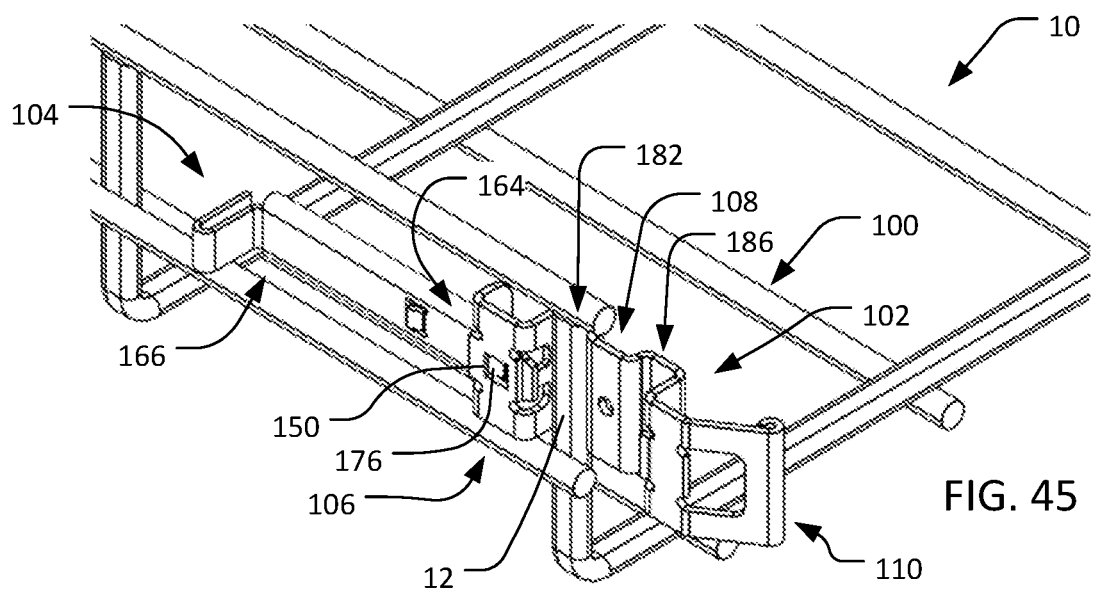
FIG. 45 is a top front right isometric view of the splice clip of FIG. 1 in the first position arranged on a discrete portion of wire mesh cable tray according to an embodiment of the invention.
Figure 46:
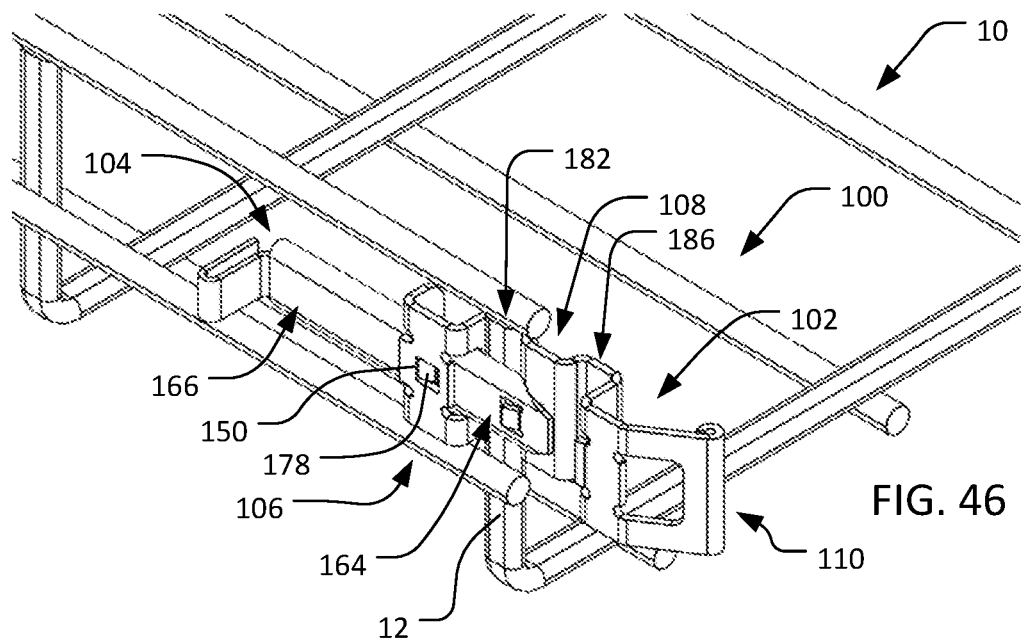
FIG. 46 is a top front right isometric view of the splice clip of FIG. 1 in the second position arranged on the discrete portion of wire mesh cable tray.

In some implementations, devices or systems disclosed herein can be utilized, manufactured, or installed using methods embodying aspects of the invention. Correspondingly, any description herein of particular features, capabilities, or intended purposes of a device or system (e.g., the splice clips 100, 200, 300, 400, 500, 600, 700, 800, 900) is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. For example, as shown in FIGS. 45 and 46, a method of installing the splice clip 100 onto a first discrete wire mesh cable tray 10 is shown. Again, as stated above, this method or a similar method can be performed with any of the disclosed splice clips described herein. The method can include arranging the splice clip 100 into the first position in which the first tab 176 of the bolt 104 is engaged within the aperture 150 in the pre-stage section 106 of the retainer 102. The splice clip 100 can then be positioned so that a first wire 12 of the first discrete wire mesh cable tray 10 is aligned to be received within the first pocket 182. The splice clip 100 can then be pressed toward the first wire 12, or vice versa, to receive the first wire 12 in the first pocket 182. The bolt 104 can then be slid from the first position (shown in FIG. 45) to the second position (shown in FIG. 46) in which the second tab 178 of the bolt 104 is engaged within the aperture 150 and the bolt 104 retains the first wire 12 within the first pocket 182. It is contemplated that the first pocket depth 190 is the same or slightly less than thickness of the first wire 12. This dimensional relationship is configured to enhance the contact forces between the retainer 102, the first wire 12, and the bolt 104, which provides a more secure connection, both mechanically and electrically. In some embodiments it is contemplated that the splice clip 100 can be spot welded to the first wire 12 and arranged as in the second position (shown in FIG. 46), for example, when discrete sections of cable mesh trays are manufactured with pre-installed splice clips.

Figure 47:
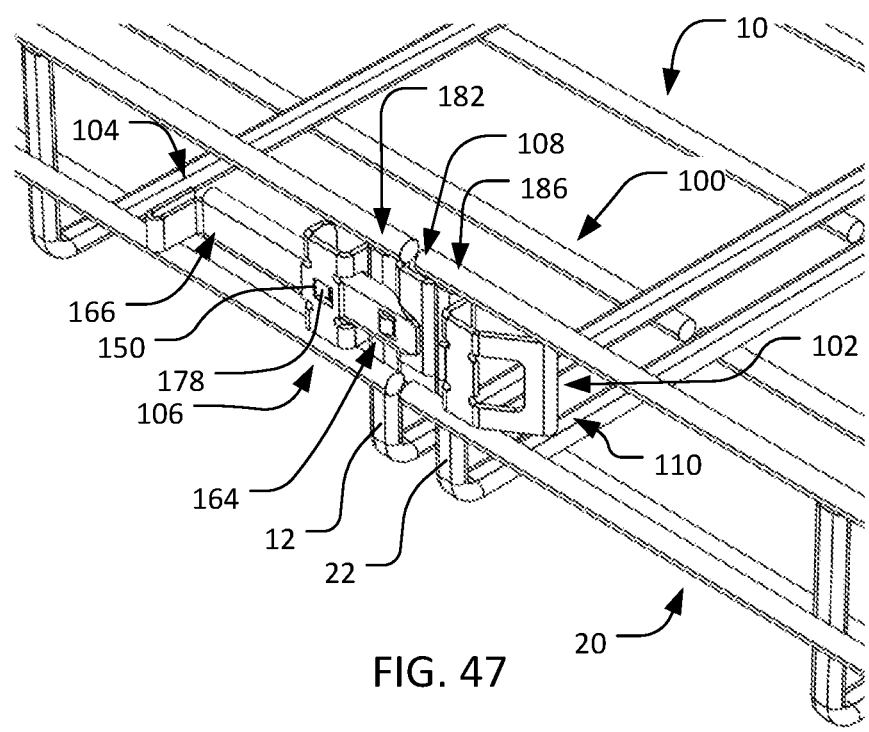
FIG. 47 is a top front right isometric view of the splice clip of FIG. 1 in the second position arranged on two discrete portions of wire mesh cable tray.
Figure 48:
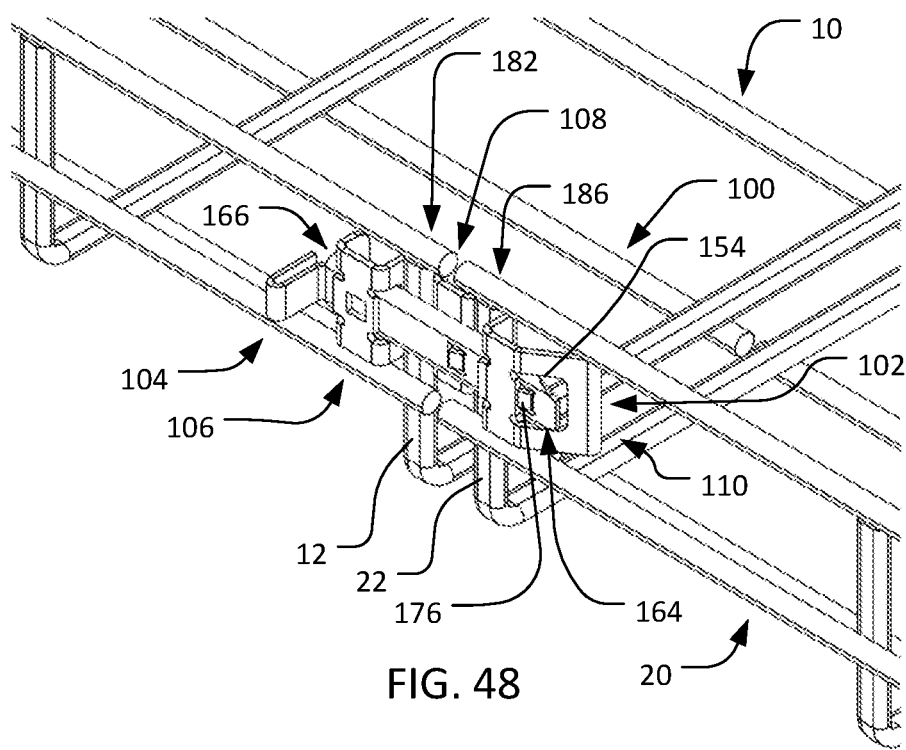
FIG. 48 is a top front right isometric view of the splice clip of FIG. 1 in the third position arranged on two discrete portions of wire mesh cable tray.

Another example method according to the present invention includes installing the splice clip 100, or any of the other splice clips 200, 300, 400, 500, 600, 700, 800, 900 as described above, onto a second discrete wire mesh cable tray 20 as shown in FIGS. 47 and 48. The method can include arranging the splice clip 100 as described above, including with respect to various guidance features, so that the first wire 12 of the first discrete wire mesh cable tray 10 is retained within the splice clip 100 and the bolt 104 is arranged in the second position. A second wire 22 of the second discrete wire mesh cable tray 20 can then be aligned to be received within the second pocket 186. The splice clip 100 can then be pressed toward the second wire 22, or vice versa, to receive the second wire 22 in the second pocket 186. The bolt 104 can then be slid from the second position (shown in FIG. 47) to the third position (shown in FIG. 48) in which the first tab 176 of the bolt 104 is engaged with the edge of the fourth guide slot 154 and the bolt 104 additionally retains the second wire 22 within the second pocket 186. Similarly, it is contemplated that the second pocket depth 192 is the same or slightly less than thickness of the second wire 22 to enhance the contact forces between the retainer 102, the second wire 22, and the bolt 104 and provide a more secure connection, both mechanically and electrically. For example, after the splice clip 100 is installed, the first and second discrete wire mesh cable trays 10, 20 are mechanically secure together and electrically equipotentially bonded.

In other embodiments, other configurations are possible. For example, certain features and combinations of features that are presented with respect to particular embodiments in the discussion above can be utilized in other embodiments and in other combinations, as appropriate. In this regard, for example, different configurations of engagement features, attachment mechanisms, and so on, as presented with respect to a particular one of the splice clips 100, 200, 300, 400, 500, 600, 700, 800, 900 can be implemented in combination with features of any number of the other splice clips 100, 200, 300, 400, 500, 600, 700, 800, 900, or others.

Likewise, although various particular guidance features for bolts are presented in the figures and descried above, various other configurations are possible. In this regard, some examples can include solid guidance features formed as planar plate sections of a retainer (e.g., as illustrated in FIGS. 23 through 44), as tabs extending in opposing lateral directions (e.g., as also illustrated in FIGS. 23 through 44), as tabs extending to only one lateral side of a clip at particular locations along a bolt, or as a bridge structure that extends to contact (e.g., slidingly guide) a bolt at a location between two channels of a retainer (e.g., as illustrated in FIGS. 1 through 44). Alternatively (or additionally), some examples can include open guidance features formed as open- or closed-sided apertures with square, round, or otherwise shaped opening profiles arranged to slidingly receive a bolt (e.g., as variously illustrated herein).

In some implementations, devices or systems disclosed herein can be utilized, manufactured, installed, etc. using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

As used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of." For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of one or more of each of multiple of the listed elements. For example, the phrases "a plurality of A, B, or C" and "two or more of A, B, or C" indicate options of: one or more A and one or more B; one or more B and one or more C; one or more A and one or more C; and one or more A, one or more B, and one or more C.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

We claim:

1. A splice clip for coupling discrete sections of a wire mesh cable tray, the splice clip comprising:
   a bolt that includes a base, a first leaf extending away from the base, and a second leaf extending away from the base; and
   a retainer with a set of pockets, including a first pocket configured to receive a first wire of a first discrete cable tray section and a second pocket configured to receive a second wire of a second discrete cable tray section;
   the bolt being secured to the retainer and movable along the retainer between:
   an open position, in which at least one of the first or second pockets is open to receive at least one of the first wire or the second wire, respectively; and
   a closed position, in which the bolt closes the first and second pockets, the first leaf extends into the first pocket to urge the first wire into the first pocket, and the second leaf extends into the second pocket to urge the second wire into the second pocket.

2. The splice clip of claim 1, wherein the first leaf and the second leaf are deflectable relative to the base to biasingly secure the first and second wires, respectively, within the first and second pockets.

3. The splice clip of claim 1, wherein the bolt is slidable relative to the retainer, between the open position and the closed position, along first and second open-sided channels that secure the bolt to the retainer.

4. The splice clip of claim 3, wherein the first open-sided channel is defined by a first ledge that extends from the base.

5. The splice clip of claim 4, wherein the first leaf is formed along the first ledge.

6. The splice clip of claim 3, wherein the retainer includes a first blade adjacent the first pocket and a second blade adjacent the second pocket, the first and second blades being received within the first open-sided channel to slidably secure the bolt to the retainer.

7. The splice clip of claim 6, wherein the first blade has a first engagement feature and the second blade has a second engagement feature, the first and second engagement features being configured to engage corresponding engagement features of the bolt to maintain the bolt at corresponding positions relative to the retainer.

8. The splice clip of claim 7, wherein the first engagement feature is a first aperture, the second engagement feature is a second aperture.

9. The splice clip of claim 8, wherein the engagement features of the bolt include a first tab arranged to separately engage the first and second apertures.

10. The splice clip of claim 1, wherein the retainer includes a blade located between the first and second pockets to support the bolt between the first and second pockets.

11. The splice clip of claim 10, wherein the blade is received within first and second open-sided channels of the bolt to slidably secure the bolt to the retainer.

12. The splice clip of claim 10, wherein the blade includes a first hole that is aligned with a second hole in the base of the bolt, with the bolt in the closed position, to receive a grounding fastener through the bolt and the blade.

13. A splice clip for coupling discrete sections of a wire mesh cable tray, the splice clip comprising:
   a bolt with a base; and
   a retainer that includes a set of pockets for wires of cable trays, including a first pocket for a first wire of a first discrete cable stray section and a second pocket for a second wire of a second discrete cable tray section;
   the bolt being slidable in an insertion direction relative to the retainer, along opposing open-sided channels that extend in the insertion direction, between:
   an open position, in which at least one of the first or second pockets is open to receive at least one of the first wire or the second wire, respectively; and
   a closed position, in which the base of the bolt closes the first and second pockets to retain the first wire within the first pocket and the second wire within the second pocket;
   the bolt being slidable engaged with the retainer, along the open-sided channels, at a bridge structure of the retainer that extends between the first and second pockets.

14. The splice clip of claim 13, wherein the bolt further includes a first protruding structure extending away from the base, and a second protruding structure extending away from the base; and
   wherein, in the closed position, the first protruding structure extends into the first pocket to resiliently secure the first wire within the first pocket and the second protruding structure extends into the second pocket to resiliently secure the second wire within the second pocket.

15. The splice clip of claim 14, wherein the open-sided channels are integrally formed with the base of the bolt and include the first and second protruding structures.

16. The splice clip of claim 13, wherein the retainer extends away from the second pocket to a curved terminal end, on a side of the second pocket that is opposite the first pocket.

17. The splice clip of claim 13, wherein the bolt and the retainer collectively include a plurality of tabs and a plurality of recesses arranged to selectively secure the splice clip in a plurality of staging configurations, including a first stage, a second stage, and a third stage;
   wherein, with the splice clip in the first stage, the bolt is aligned relative to the retainer so that the first and second pocket are open to receive the first and second wires;
   wherein, with the splice clip in the second stage, the bolt is aligned relative to the retainer to close the first pocket, with the second pocket open to receive the second wire; and
   wherein, with the splice clip in the third stage, the bolt is aligned relative to the retainer to close the first and second pockets.

18. A method for joining a first discrete section and a second discrete section of a wire mesh cable tray, the method comprising:
   attaching a splice clip to a first wire of the first discrete section by inserting the first wire into a first pocket of a retainer of the splice clip;
   attaching the splice clip to a second wire of the second discrete section by inserting the second wire into a second pocket of the retainer; and
   with the first and second wires within the first and second pockets, respectively, and a bolt of the splice clip engaged with the retainer along a first open-sided channel, sliding the bolt to a closed position on the retainer to retain the first wire within the first pocket and the second wire within the second pocket, including:
   aligning a first retention structure of the bolt to extend into the first pocket and biasingly retain the first wire within the first pocket; and
   aligning a second retention structure of the bolt to extend into the second pocket and biasingly retain the second wire within the second pocket.

* * * * *

UNITED STATES PATENT AND TRADEMARK OFFICE
CERTIFICATE OF CORRECTION

PATENT NO. : 12,294,207 B2  
APPLICATION NO. : 18/635178  
DATED : May 6, 2025  
INVENTOR(S) : Eric J. Wilson et al.

Page 1 of 1

It is certified that error appears in the above-identified patent and that said Letters Patent is hereby corrected as shown below:

In the Specification

Column 7, Line 46, "scc" should be --see--.

Column 16, Line 24, "case" should be --ease--.

Signed and Sealed this  
Twenty-fourth Day of June, 2025

Coke Morgan Stewart  
*Acting Director of the United States Patent and Trademark Office*